(12) United States Patent
Harada et al.

(10) Patent No.: US 12,726,926 B2
(45) Date of Patent: Sep. 1, 2026

(54) COMMUNICATION APPARATUS, BASE STATION, AND COMMUNICATION METHOD FOR CONTROLLING UPLINK TRANSMISSION BASED ON TIME ALIGNMENT TIMER

(71) Applicant: DENSO CORPORATION, Kariya-city (JP)

(72) Inventors: Misa Harada, Nisshin-city (JP); Hideaki Takahashi, Kariya-city (JP); Takafumi Nishi, Nisshin-city (JP); Hideo Himeno, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 292 days.

(21) Appl. No.: 18/426,068

(22) Filed: Jan. 29, 2024

(65) Prior Publication Data

US 2024/0172157 A1 May 23, 2024

Related U.S. Application Data

(63) Continuation of application No. PCT/JP2022/030024, filed on Aug. 4, 2022.

(30) Foreign Application Priority Data

Aug. 4, 2021 (JP) ................................ 2021-128624

(51) Int. Cl.
*H04W 56/00* (2009.01)

(52) U.S. Cl.
CPC ..... *H04W 56/0045* (2013.01); *H04W 56/001* (2013.01)

(58) Field of Classification Search
CPC . H04W 72/23; H04W 72/231; H04W 72/232; H04W 76/34; H04W 76/38;
(Continued)

(56) References Cited

U.S. PATENT DOCUMENTS 9,215,678 B2 * 12/2015 Dinan .................. H04L 5/0085
2013/0260735 A1 10/2013 Dinan
(Continued)

FOREIGN PATENT DOCUMENTS

EP 3586469 B1 12/2020
WO WO-2020121497 A1 6/2020

OTHER PUBLICATIONS

Notice of Reasons for Refusal regarding Japanese Patent Application No. 2021-128624, dated Jun. 3, 2025. Translation provided by Ozawa IP Firm.

(Continued)

*Primary Examiner* — Peter Chen
(74) *Attorney, Agent, or Firm* — Harness, Dickey & Pierce, P.L.C.

(57) ABSTRACT

Disclosed is a communication apparatus comprising: a receiver configured to: receive, from a base station, a radio resource control (RRC) signaling including information for configuring an identifier of a timing advance group corresponding to a transmission configuration indication (TCI) state, and receive, from the base station, information for activating the TCI; and a controller configured to control a time alignment timer corresponding to the timing advance group, wherein the controller is configured to control not to perform an uplink transmission on the timing advance group corresponding to the TCI state in a case where the time alignment timer expires.

12 Claims, 16 Drawing Sheets

(58) Field of Classification Search
CPC ............. H04W 56/001; H04W 56/004; H04W 56/0045; H04W 56/005; H04L 5/0048; H04L 5/005; H04L 5/0051; H04L 5/0053; H04B 7/06964; H04B 7/0695; H04B 7/088
See application file for complete search history.

(56) References Cited

U.S. PATENT DOCUMENTS

2015/0049753 A1* 2/2015 Park ....................... H04J 11/005 370/350
2015/0098400 A1* 4/2015 Lee ........................ H04J 11/005 370/329
2020/0100201 A1 3/2020 Farmanbar et al.
2021/0282043 A1* 9/2021 Babaei .................. H04L 5/0098

OTHER PUBLICATIONS

RP-211190, 3GPP TSG RAN Meeting #92-e, Discussion on work scope for Rel-17 feNR-MIMO in RAN2, Samsung, Electronic Meeting, Jun. 14-18, 2021, pp. 1-5.
R2-2106314, 3GPP TSG-RAN WG2 Meeting #114 electronic, Summary of email discussion [Post113bis-e][061][feMIMO] InterCell mTRP and L1L2 mobility (Samsung), Samsung, Online, May 19-27, 2021, pp. 1-39.
R2-2106664, 3GPP TSG-RAN WG2 #114-e electronic, [AT114-e][036][feMIMO] InterCell mTRP and L1/L2 mobility (Samsung), Samsung, Electronic Meeting, May 19-27, 2021, pp. 1-28.
R2-2106787, 3GPP TSG-RAN WG2 Meeting #114 electronic, LS Reply on TCI State Update for L1/L2-Centric Inter-Cell Mobility, RAN2, Online, May 19-27, 2021, pp. 1-4.
3GPP TS 38.213 V16.0.0 (Dec. 2019), 3rd Generation Partnership Project; Technical Specification Group Radio Access Network; NR; Physical layer procedures for control (Release 16), pp. 1-146.
3GPP TS 38.321 V16.0.0 (Mar. 2020), 3rd Generation Partnership Project; Technical Specification Group Radio Access Network; NR; Medium Access Control (MAC) protocol specification (Release 16), pp. 1-141.
3GPP TS 38.133 V16.0.0 (Jun. 2019), 3rd Generation Partnership Project; Technical Specification Group Radio Access Network; NR; Requirements for support of radio resource management (Release 16), pp. 1-999.
3GPP TS 38.211 v16.6.0 (Jun. 2021), 3rd Generation Partnership Project; Technical Specification Group Radio Access Network; NR; Physical channels and modulation (Release 16), pp. 1-134.
3GPP TS 38.212 v16.6.0 (Jun. 2021), 3rd Generation Partnership Project; Technical Specification Group Radio Access Network; NR; Multiplexing and channel coding (Release 16), pp. 1-153.
3GPP TS 38.213 v16.6.0 (Jun. 2021), 3rd Generation Partnership Project; Technical Specification Group Radio Access Network; NR; Physical layer procedures for control (Release 16), pp. 1-187.
3GPP TS 38.321 v16.4.0 (Mar. 2021), 3rd Generation Partnership Project; Technical Specification Group Radio Access Network; NR; Medium Access Control (MAC) protocol specification (Release 16), pp. 1-157.
RP-211586, 3GPP TSG RAN Meeting #92e, Revised WID: Further enhancements on MIMO for NR, Samsung, Electronic Meeting, Jun. 14-18, 2021, pp. 1-6.
R2-2101525, 3GPP TSG-RAN WG2 Meeting #113-e, Correction on CG type 1 resources handling when TA is expired—Option 2, ZTE Corporation, Sanechips, Online, Jan. 25-Feb. 5, 2021, pp. 1-5.
3GPP TSG RAN WG1 #104bis-e, e-Meeting, R1-2103014, Intel Corporation, Enhancements to Multi-Beam Operation, Apr. 12-20, 2021, pp. 1-26.

* cited by examiner 1
10
20
30
200
200
300
300
100
UE
NG
NG
NG
NG
Xn

FIG. 2

100
UE
NAS
RRC
PDCP
RLC
MAC
PHY

200
BASE STATION
RRC
PDCP
RLC
MAC
PHY

300
CORE NETWORK APPARATUS (AMF)
NAS

FIG. 4

CU
203
DU
202
C1
C2
201#1
201#2
TCI state #1
TCI state #1
TCI state #2
TCI state #2
100

FIG. 6

100
UE
120
CONTROLLER
110
COMMUNICATOR
111
TRANSMITTER
112
RECEIVER

FIG. 7

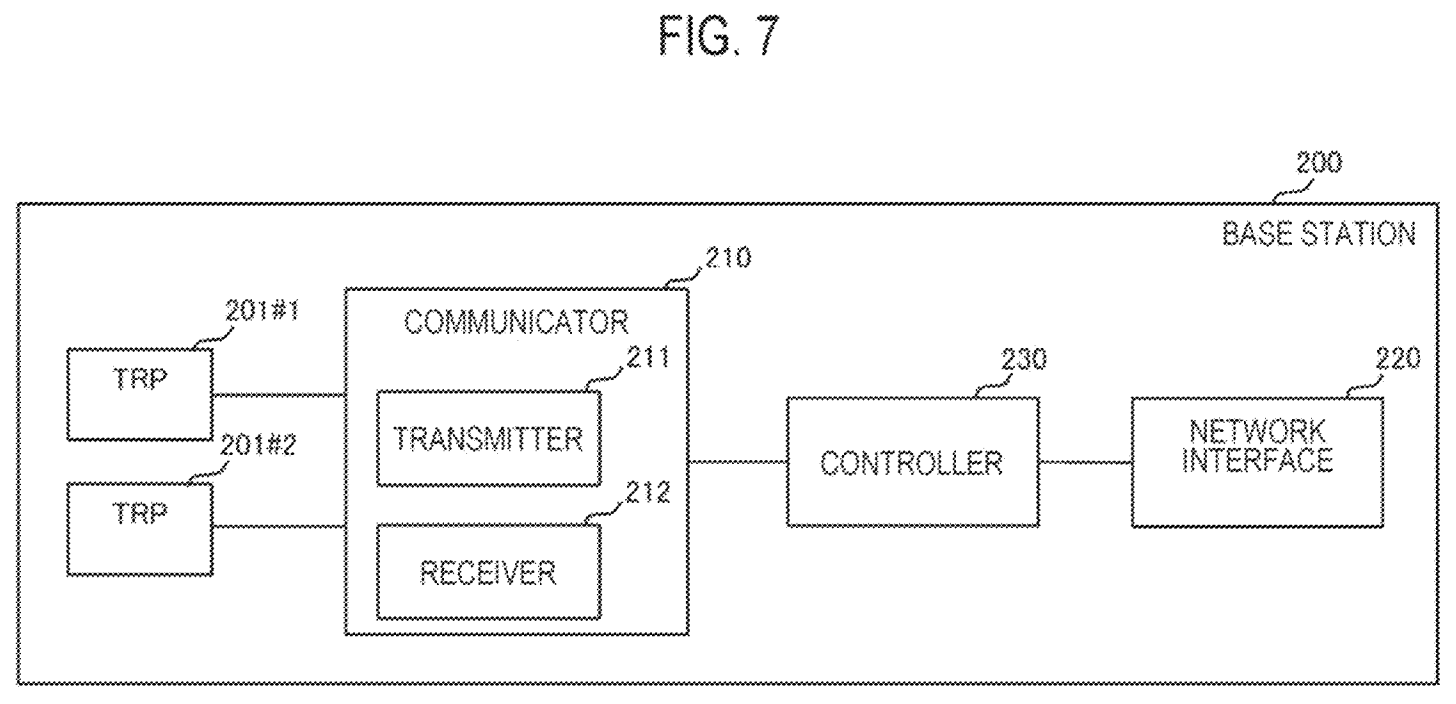

200
BASE STATION
220
NETWORK INTERFACE
230
CONTROLLER
210
COMMUNICATOR
211
TRANSMITTER
212
RECEIVER
201#1
TRP
201#2
TRP

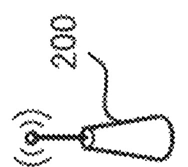
FIG. 11
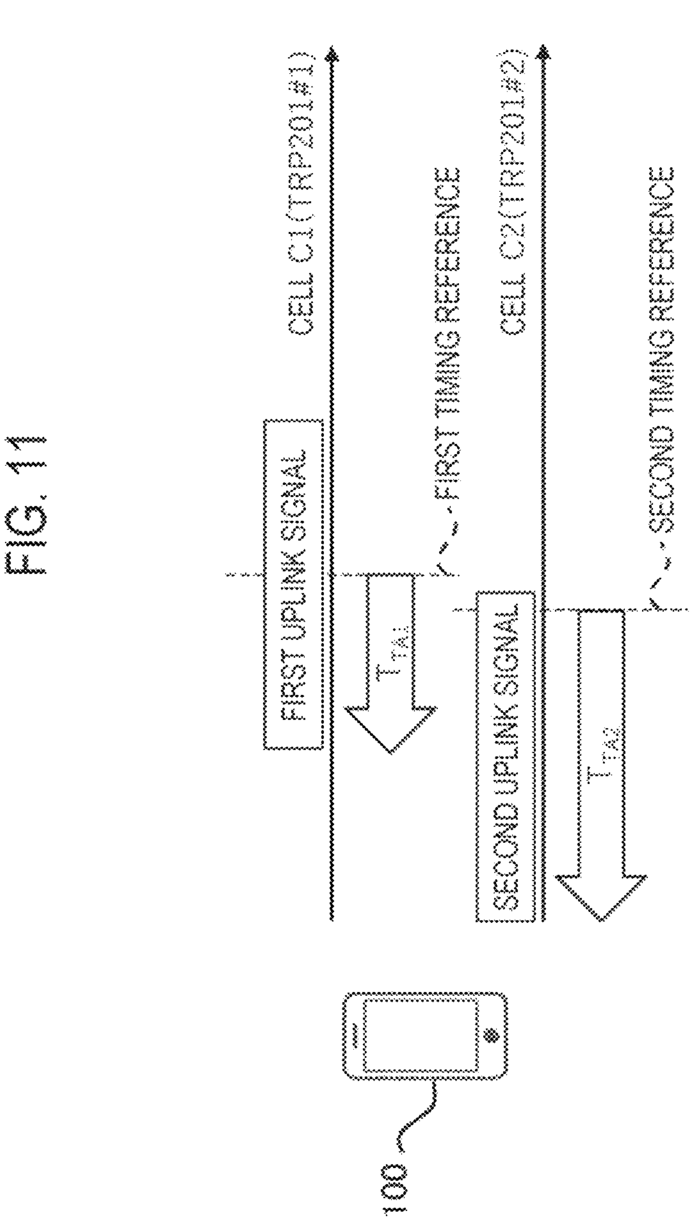

FIG. 13

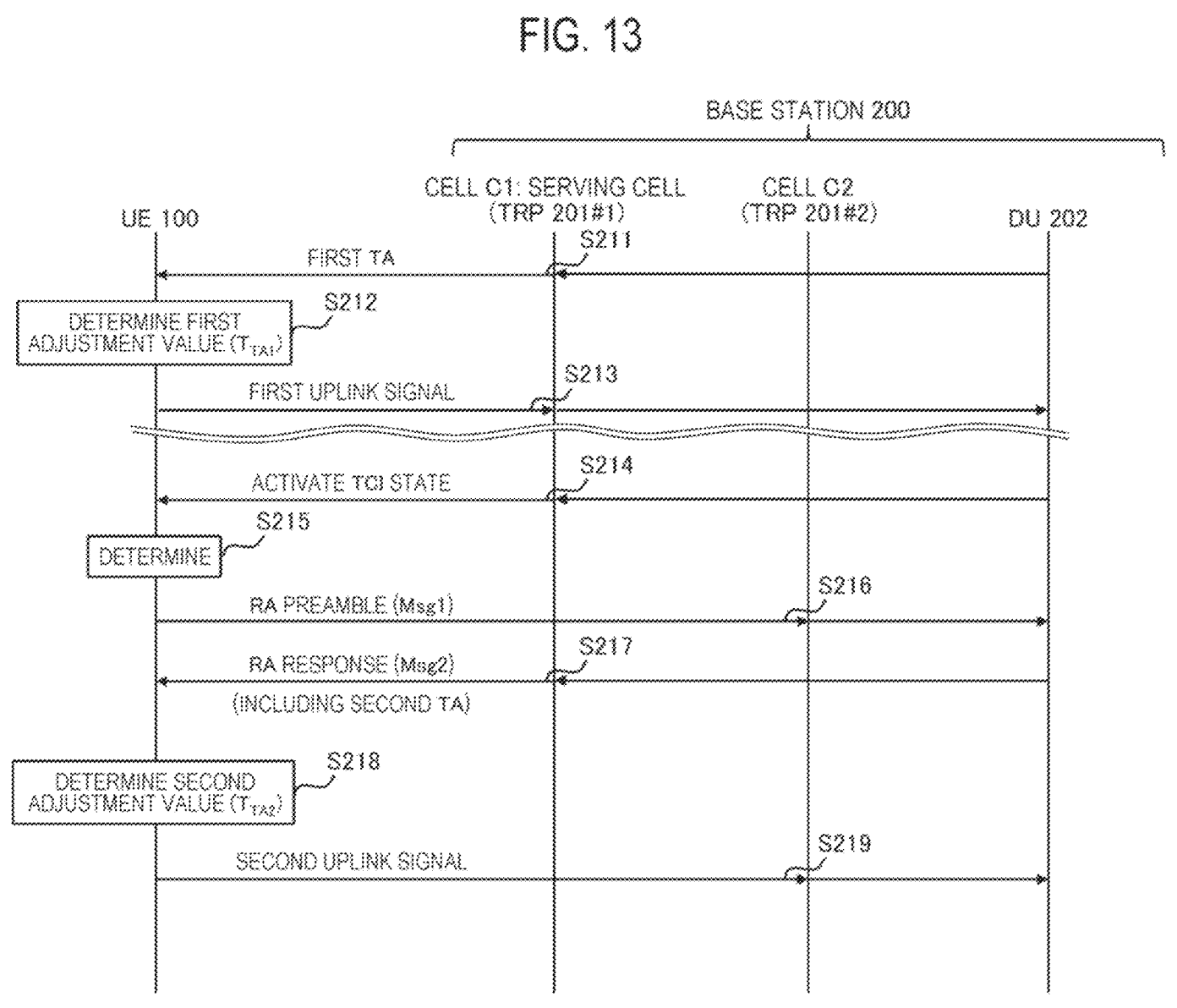

BASE STATION 200
CELL C1: SERVING CELL (TRP 201#1)
CELL C2 (TRP 201#2)
UE 100
DU 202
S211
FIRST TA
S212
DETERMINE FIRST ADJUSTMENT VALUE ($T_{TA1}$)
S213
FIRST UPLINK SIGNAL
S214
ACTIVATE TCI STATE
S215
DETERMINE
S216
RA PREAMBLE (Msg1)
S217
RA RESPONSE (Msg2) (INCLUDING SECOND TA)
S218
DETERMINE SECOND ADJUSTMENT VALUE ($T_{TA2}$)
S219
SECOND UPLINK SIGNAL

COMMUNICATION APPARATUS, BASE STATION, AND COMMUNICATION METHOD FOR CONTROLLING UPLINK TRANSMISSION BASED ON TIME ALIGNMENT TIMER

CROSS-REFERENCE TO RELATED APPLICATIONS

The present application is a continuation application of international Patent Application No. PCT/JP2022/030024, filed on Aug. 4, 2022, which designated the U.S., and claims the benefit of priority of Japanese Patent Application No. 2021-128624, filed on Aug. 4, 2021, the entire contents of which are incorporated herein by reference.

TECHNICAL FIELD

The present disclosure relates to a communication apparatus, and a communication method used in a mobile communication system.

BACKGROUND ART

In the 3GPP (3rd Generation Partnership Project) (registered trademark. The same applies hereinafter), which is a standardization project for mobile communication systems, the introduction of multiple transmission/reception point (TRP) transmission is being considered as an extension of MIMO (Multi-Input Multi-Output).

In a scenario of the multiple TRP transmission, a model is assumed in which a first cell serving as a serving cell and a second cell belonging to the same frequency (an intra frequency) as that of the first cell are configured in a communication apparatus, and the communication apparatus performs data communication with the second cell while maintaining the first cell as the serving cell (refer to Non Patent Literatures 1 to 3). Here, the second cell is a cell (a cell having a TRP with a different PCI) that is configured by a TRP different from that of the first cell and has a physical cell identifier (PCI) different from that of the first cell.

Meanwhile, in order to compensate for a propagation delay, a communication apparatus at a position away from a cell transmits an uplink signal at an earlier timing than a communication apparatus at a position close to the cell. Specifically, the communication apparatus adjusts the transmission timing of an uplink signal based on a timing advance from a base station.

CITATION LIST

Non Patent Literature

Non Patent Literature 1: 3GPP Contribution: RP-211190, "Discussion on work scope for Rel-17 feNR-MIMO in RAN2"

Non Patent Literature 2: 3GPP Contribution: R2-2106787, "LS Reply on TCI State Update for L1/L2-Centric Inter-Cell Mobility"

Non Patent Literature 3: 3GPP Contribution: RP-211586, "Revised WID: Further enhancements on MIMO for NR"

SUMMARY OF INVENTION

In the above-described multiple TRP transmission scenario, a case is assumed in which the communication apparatus maintains an alignment timer (timeAlignmentTimer) that controls a time during which the transmission timing of the uplink signal to the first cell is regarded as being adjusted and an alignment timer (timeAlignmentTimer) that controls a time during which the transmission timing of the uplink signal to a second cell is regarded as being adjusted. In this case, since the operation of the communication apparatus is not specified, there is a concern that the transmission of the uplink signal to the second cell cannot be appropriately controlled.

Therefore, an object of the present disclosure is to provide a communication apparatus and a communication method capable of appropriately controlling, when a first cell serving as a serving cell and a second cell belonging to the same frequency as that of the first cell are configured, transmission of an uplink signal to the second cell.

A communication apparatus (100) according to a first aspect is a communication apparatus (100) having a first cell (C1) and a second cell (C2) configured therein by a base station (200). The communication apparatus comprises: a transmitter configured to transmit an uplink signal to the first cell (C1) by using a first resource related to transmission of the uplink signal to the first cell (C1), and to transmit an uplink signal to the second cell (C2) by using a second resource related to transmission of the uplink signal to the second cell (C2); and a controller (120) configured to maintain a first alignment timer that controls a time during which the transmission timing of the uplink signal to the first cell (C1) is regarded as being adjusted, in which the controller (120) is configured to release, when the first alignment timer expires, the first resource and the second resource.

A communication method according to a second aspect is a communication method executed by a communication apparatus (100) having a first cell (C1) and a second cell (C2) configured therein by a base station (200). The communication method comprises: transmitting an uplink signal to the first cell (C1) by using a first resource related to transmission of the uplink signal to the first cell (C1), and transmitting an uplink signal to the second cell (C2) by using a second resource related to transmission of the uplink signal to the second cell (C2); maintaining a first alignment timer that controls a time during which the transmission timing of the uplink signal to the first cell (C1) is regarded as being adjusted; and releasing, when the first alignment timer expires, the first resource and the second resource.

BRIEF DESCRIPTION OF DRAWINGS

The foregoing and other objects, features, and advantages of the present disclosure will become more apparent from the following detailed description with reference to the accompanying drawings.

FIG. 2 is a diagram illustrating a configuration example of a protocol stack of the mobile communication system according to the embodiment.

FIG. 4 is a diagram illustrating an assumed scenario in the mobile communication system according to the embodiment.

FIG. 6 is a diagram illustrating a configuration of a UE according to the embodiment.

FIG. 7 is a diagram illustrating a configuration of a base station according to the embodiment.

FIG. 11 is an explanatory diagram illustrating the second operation example in the mobile communication system according to the embodiment.

FIG. 13 is a diagram illustrating a sequence (part 1) of a fourth operation example in the mobile communication system according to the embodiment.

DESCRIPTION OF EMBODIMENTS

Figure 1:
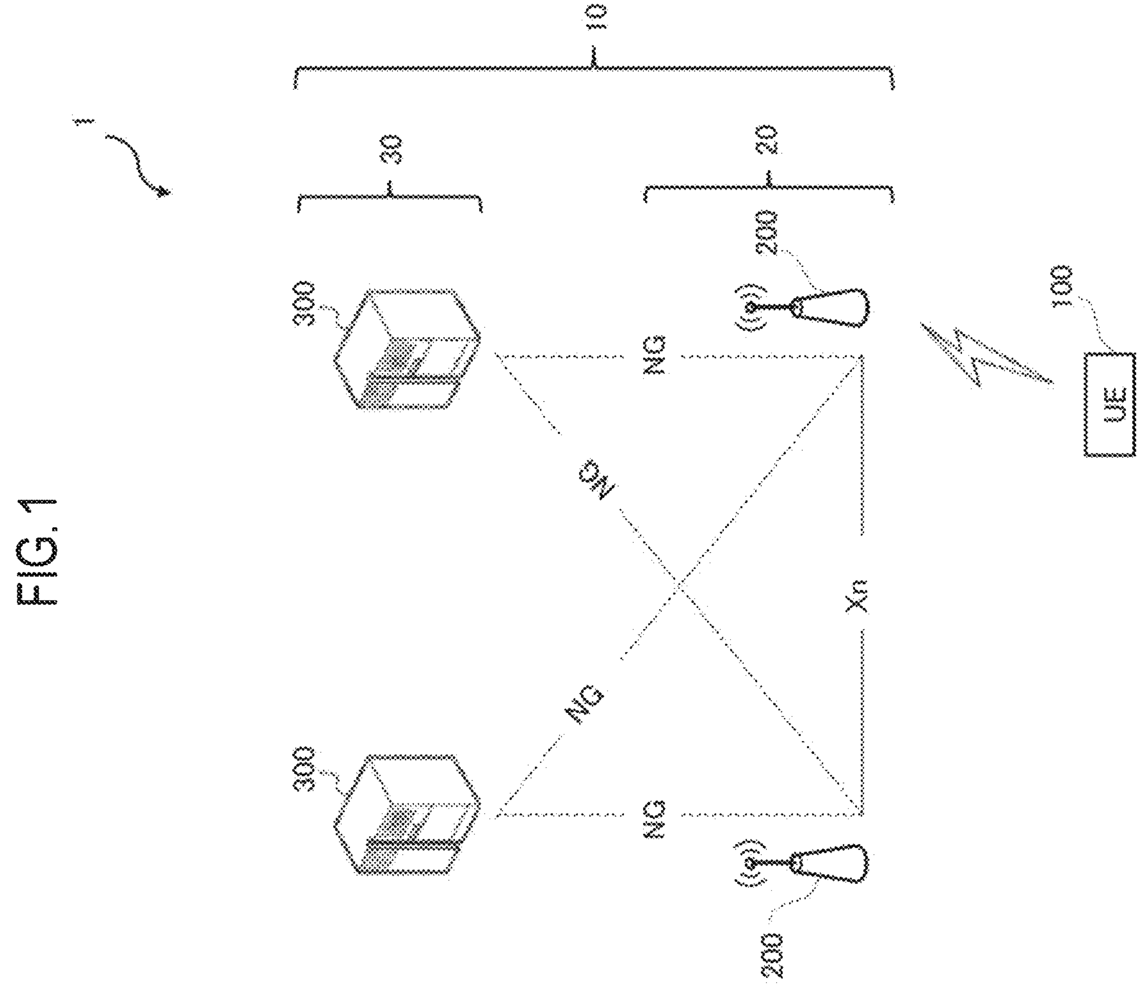
FIG. 1 is a diagram illustrating a configuration of a mobile communication system according to an embodiment.

A mobile communication system according to an embodiment will be described with reference to the drawings. In the description of the drawings, the same or similar parts are denoted by the same or similar reference numerals.

(Configuration of Mobile Communication System)

A configuration of a mobile communication system 1 according to the embodiment will be described with reference to FIG. 1. The mobile communication system 1 is, for example, a system conforming to a technical specification (TS) of the 3GPP. Hereinafter, as the mobile communication system 1, a description will be given, as an example, as to the 5th generation system (5GS) of the 3GPP standard, that is, a mobile communication system based on a NR (New Radio).

The mobile communication system 1 includes a network 10 and a communication apparatus (user equipment (UE)) 100 that communicates with the network 10. The network 10 includes a NG-RAN (Next Generation Radio Access Network) 20, which is a 5G radio access network, and a 5GC (5G Core Network) 30, which is a 5G core network.

The UE 100 is an apparatus used by a user. The UE 100 is, for example, a mobile apparatus such as a mobile phone terminal such as a smartphone, a tablet terminal, a notebook PC (Personal Computer), a communication module, or a communication card. The UE 100 may be a vehicle (for example, a car or a train) or an apparatus provided in the vehicle. The UE 100 may be a transport body other than a vehicle (for example, a ship or an airplane) or an apparatus provided in the transport body. The UE 100 may be a sensor or an apparatus provided in the sensor. It is noted that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

The NG-RAN 20 includes a plurality of base stations 200. Each of the base stations 200 manages at least one cell. A cell forms a minimum unit of a communication area. For example, one cell belongs to one frequency (a carrier frequency) and is formed by one component carrier. The term "cell" may represent a radio communication resource, and may also represent a communication target of the UE 100. Each of the base stations 200 can perform radio communication with the UE 100 existing in its own cell. The base station 200 communicates with the UE 100 by using a protocol stack of the RAN. The base station 200 provides NR user plane and control plane protocol terminations towards the UE 100 and is connected to the 5GC 30 via an NG interface. Such an NR base station 200 may be referred to as a gNodeB (gNB).

The 5GC 30 includes a core network apparatus 300. The core network apparatus 300 includes, for example, an AMF (Access and Mobility Management Function) and/or a UPF (User Plane Function). The AMF performs mobility management of the UE 100. The UPF provides a function specialized for user plane processing. The AMF and the UPF are connected to the base station 200 via the NG interface.

Figure 2:
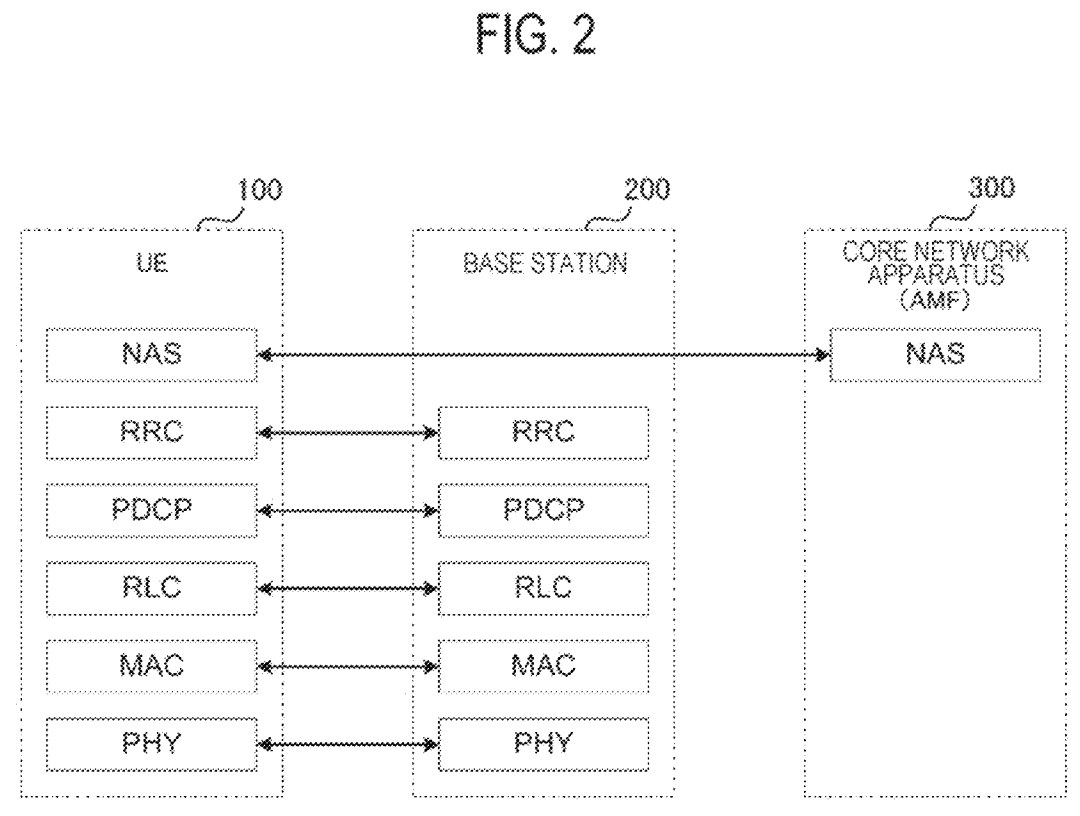

A configuration example of the protocol stack in the mobile communication system 1 according to the embodiment will be described with reference to FIG. 2. A protocol of a radio section between the UE 100 and the base station 200 includes a physical (PHY) layer, a MAC (Medium Access Control) layer, an RLC (Radio Link Control) layer, a PDCP (Packet Data Convergence Protocol) layer, and an RRC (Radio Resource Control) layer.

The PHY layer performs encoding and decoding, modulation and demodulation, antenna mapping and demapping, and resource mapping and demapping. Data and control information are transmitted between the PHY layer of the UE 100 and the PHY layer of the base station 200 via a physical channel.

The physical channel includes a plurality of OFDM (Orthogonal Frequency Division Multiplexing) symbols in the time domain and a plurality of subcarriers in the frequency domain. One subframe includes a plurality of OFDM symbols in the time domain. A resource block is a resource allocation unit, and includes a plurality of OFDM symbols and a plurality of subcarriers. A frame can be composed of 10 ms, and can include 10 subframes composed of 1 ms. A number of slots corresponding to a subcarrier spacing may be included in the subframe.

Among the physical channels, a physical downlink control channel (PDCCH) plays a central role for purposes such as, for example, downlink scheduling allocation, uplink scheduling grant, and transmission power control.

In the NR, the UE 100 can use a bandwidth narrower than a system bandwidth (that is, the bandwidth of the cell). The base station 200 configures, in the UE 100, a bandwidth part (BWP) including consecutive PRBs (Physical Resource Blocks). The UE 100 transmits and receives data and a control signal in an active BWP. In the UE 100, for example, a maximum of four BWPs can be configured. The BWPs may have different subcarrier spacings or may have frequencies overlapping each other. In a case where a plurality of BWPs are configured in the UE 100, the base station 200 can designate which BWP is to be activated by control in downlink. As a result, the base station 200 can dynamically adjust a UE bandwidth according to the amount of data traffic of the UE 100 and the like, and can reduce the UE power consumption.

The base station 200 may configure, for example, a maximum of three control resource sets (CORESETs) for each of a maximum of four BWPs on a serving cell. The CORESET is a radio resource for control information to be received by the UE 100. A maximum of 12 CORESETs may be configured on the serving cell in the UE 100. Each CORESET has an index of 0 to 11. For example, the CORESET includes six resource blocks (PRB) and one, two, or three consecutive OFDM symbols in the time domain.

The MAC layer performs priority control of data, retransmission processing by a hybrid ARQ (HARQ (Hybrid Automatic Repeat request)), a random access procedure, and the like. Data and control information are transmitted, via a transport channel, between the MAC layer of the UE 100 and the MAC layer of the base station 200. The MAC layer of the base station 200 includes a scheduler. The scheduler determines uplink and downlink transport formats (transport block size and modulation and coding scheme (MCS)) and resources to be allocated to the UE 100.

The RLC layer transmits data to the RLC layer on a reception side using the functions of the MAC layer and the PHY layer. Data and control information are transmitted between the RLC layer of the UE 100 and the RLC layer of the base station 200 via a logical channel.

The PDCP layer performs header compression and decompression and encryption and decryption.

A SDAP (Service Data Adaptation Protocol) layer may be provided as an upper layer of the PDCP layer. The SDAP (Service Data Adaptation Protocol) layer performs mapping between an IP flow, which is a unit in which a core network performs QoS control, and a radio bearer, which is a unit in which an AS (Access Stratum) performs QoS control.

The RRC layer controls the logical channel, the transport channel, and the physical channel according to establishment, reestablishment, and release of the radio bearer. RRC signaling for various configurations is transmitted between the RRC layer of the UE 100 and the RRC layer of the base station 200. In a case where there is an RRC connection between the RRC of the UE 100 and the RRC of the base station 200, the UE 100 is in an RRC connected state. In a case where there is no RRC connection between the RRC of the UE 100 and the RRC of the base station 200, the UE 100 is in an RRC idle state. In a case where the RRC connection between the RRC of the UE 100 and the RRC of the base station 200 is suspended, the UE 100 is in an RRC inactive state.

A NAS layer located above the RRC layer performs session management and mobility management of the UE 100. NAS signaling is transmitted between the NAS layer of the UE 100 and the NAS layer of the core network apparatus 300 (AMF). It is noted that the UE 100 has an application layer and the like in addition to a protocol of a radio interface.

(Adjustment Method of Uplink Transmission Timing)

Figure 3:
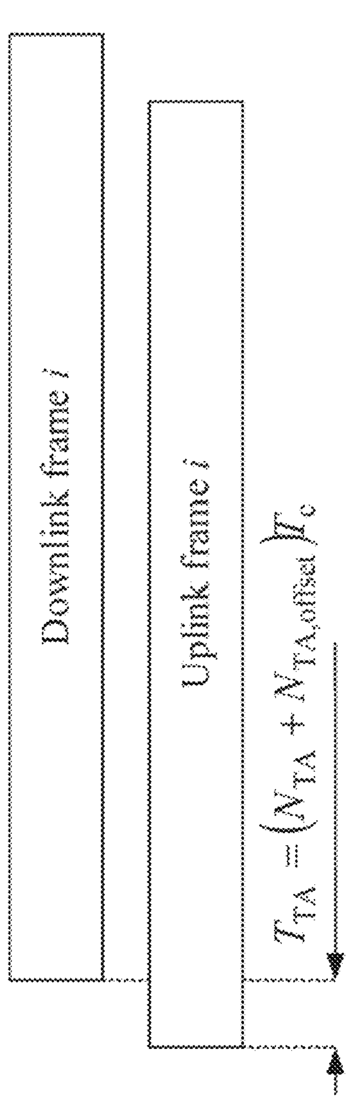
FIG. 3 is an explanatory diagram illustrating a relationship between an uplink frame and a downlink frame in the mobile communication system according to the embodiment.

An example of a method of adjusting an uplink transmission timing in the mobile communication system 1 according to the embodiment will be described with reference to FIG. 3. That is, a method of synchronizing the uplink transmission timings will be described.

The base station 200 controls a transmission timing of the uplink signal of each UE 100 in order to keep a receive timing of the uplink signal from each UE 100 in the managed cell within a designated time range. The base station 200 determines a timing advance (hereinafter, TA) for the UE 100 to adjust the transmission timing of the uplink signal. The base station 200 provides the determined TA to each UE 100.

Figure 4:
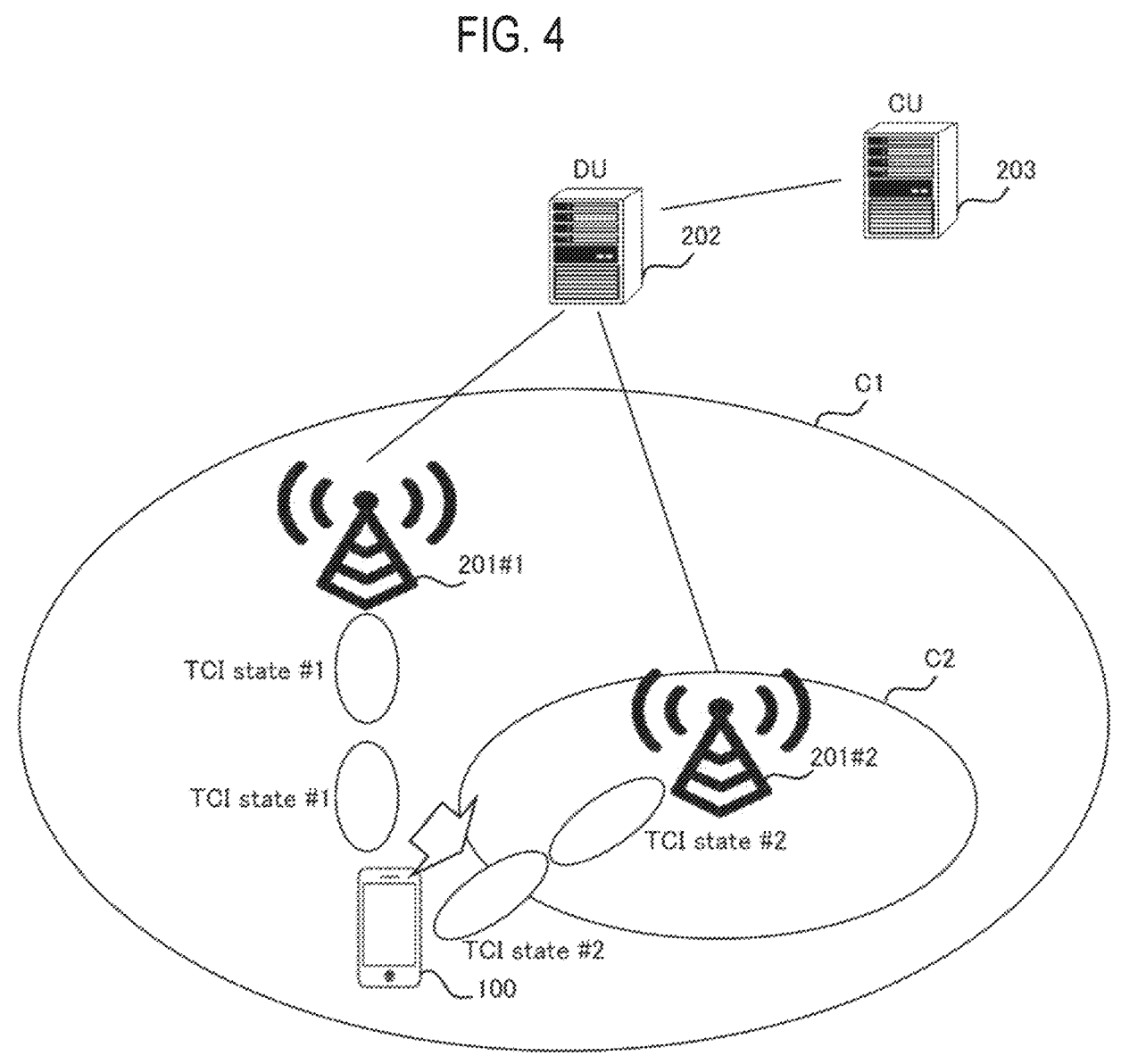

The UE 100 adjusts the timing of uplink transmission based on a downlink frame timing. The UE 100 uses the TA to adjust an uplink frame timing with respect to a downlink frame. As illustrated in FIG. 4, the UE 100 shifts the ith uplink frame forwards with respect to the ith downlink frame by a time of $(N_{TA}+N_{TA,\ offset})$ Tc. The UE 100 calculates an alignment value $(T_{TA})$ to be shifted with respect to the downlink frame using, for example, the following equation.

[Mathematical Formula 1]

$$T_{TA}=(N_{TA}+N_{TA,offset})T_c \quad \text{(Equation 1)}$$

$$N_{TA\_new}=N_{TA\_old}+(T_A-31)\cdot 16\cdot 64/2^{\mu} \quad \text{(Equation 2)}$$

$$N_{TA}=T_A\cdot 16\cdot 64/2^{\mu} \quad \text{(Equation 3)}$$

The $N_{TA}$ is a value (appropriately referred to as a TA value) calculated based on TA $(T_A)$ notified from the base station 200 (cell). $N_{TA}$ can be calculated by Equations 2 and 3.

TA $(T_A)$ in Equation 2 is a value of a timing advance command (a TA command) included in a media access control (MAC) control element (CE). In response to the reception of the TA command, the UE 100 calculates a new TA value $(N_{TA\_NEW})$ from a maintained TA value $(N_{TA\_old})$. TA (TA) in Equation 3 is a value of a timing advance included in a random access response. It is noted that u is a subcarrier spacing configuration.

$N_{TA\_offset}$ is a fixed offset value used to calculate the alignment value $(T_{TA})$. $N_{TA,\ offset}$ may be notified from the base station 200 (cell). When $N_{TA,\ offset}$ is not notified from the base station 200, the UE 100 may determine $N_{TA,\ offset}$ as a default value. The UE 100 may determine the offset value $(N_{TA,\ offset})$ according to conditions such as a frequency band, presence or absence of MR-DC, and presence or absence of coexistence of NR/NB-IOT. For example, the UE 100 may determine the offset value $(N_{TA,\ offset})$ using table 1 below.

TABLE 1

| Frequency range and band of cell used for uplink transmission | $N_{TAoffset}$ (Unit: $T_C$) |
|---|---|
| FR1 FDD or TDD band with neither E-UTRA-NR nor NB-IoT-NR coexistence case | 25600 (Note 1) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) |
| FR2 | 13792 |

(Note 1):
The UE identifies $N_{TAoffset}$ based on the information n-TimingAdvanceOffset as specified in TS 38.331 [2]. If UE is not provided with the information n-TimingAdvanceOffset, the default value of $N_{TAoffset}$ is set as 25600 for FR1 band. In case of multiple UL carriers in the same TAG, UE expects that the same value of n-TimingAdvanceOffset is provided for all the UL carriers according to clause 4.2 in TS 38.213 and the value 39936 of $N_{TAoffset}$ can also be provided for a FDD serving cell.
Note 2:
Void Tc is a basic time unit. Tc is a designated fixed value. The UE 100 maintains the information of Tc in advance. Tc is, for example, 0.509 ns.

The downlink frame timing serving as a reference for adjusting the uplink transmission timing is a timing of the head of the downlink frame. Specifically, the downlink frame timing is defined as a time when a first path detected (within the time) of the downlink frame is received from the base station 200 (specifically, a reference cell). It is noted that a radio frame forming the uplink frame and the downlink frame includes 10 subframes of 1 ms. Each frame is divided into two half-frames of the same size consisting of five subframes.

The UE 100 can grasp the downlink frame timing in the BWP that has received the SSB by synchronizing the downlink timings using the synchronization signal included in the reference signal (SS/PBCH block (SSB)) transmitted in the BWP.

It is noted that the SSB includes a primary synchronization signal (PSS), a secondary synchronization signal (SSS), a PBCH (Physical Broadcast Channel), and a demodulation reference signal (DMRS). For example, the SSB may be composed of four consecutive OFDM symbols in the time domain. In addition, the SSB may be composed of 240 consecutive subcarriers (that is, 20 resource blocks) in the frequency domain. The PBCH is a physical channel that carries a master information block (MIB).

(Assumed Scenario)

An assumed scenario in the mobile communication system 1 according to the embodiment will be described with reference to FIG. 4.

The base station 200 includes a TRP 201 #1, a TRP 201 #2, a DU (Distributed Unit) 202, and a CU (Central Unit) 203. Although FIG. 4 illustrates an example in which the base station 200 is separated into the DU 202 and the CU 203, the base station 200 may not be separated into the DU 202 and the CU 203. In addition, although an example in which the number of TRPs 201 of the base station 200 is two is illustrated, the number of TRPs 201 of the base station 200 may be three or more. The TRPs 201 #1 and 201 #2 are dispersedly disposed and constitute different cells. Specifically, the TRP 201 #1 forms a cell C1, and the TRP 201 #2 forms a cell C2.

The cell C1 and the cell C2 belong to the same frequency. The cell C1 and the cell C2 have different physical cell identifiers (PCI). That is, the cell C2 is a cell (a cell having TRP with different PCI) including the TRP #2 different from the TRP 201 #1 corresponding to the cell C1, and having the PCI different from the cell C1. Although FIG. 4 illustrates an example in which the coverage of the cell C2 is within the coverage of the cell C1, the coverage of the cell C2 may overlap at least partially with the coverage of the cell C1.

The DU 202 controls the TRP 201 #1 and the TRP 201 #2. In other words, the TRP 201 #1 and the TRP 201 #2 are under the control of the same DU 202. The DU 202 is a unit including lower layers included in the above-described protocol stack, for example, an RLC layer, a MAC layer, and a PHY layer. The DU 202 is connected to the CU 203 via an F1 interface which is a fronthaul interface.

The CU 203 controls the DU 202. The CU 203 is a unit including upper layers included in the above-described protocol stack, for example, an RRC layer, an SDAP layer, and a PDCP layer. The CU 203 is connected to the core network (5GC 30) via the NG interface which is a backhaul interface.

The UE 100 is in the RRC connected state and performs radio communication with the base station 200. The NR can perform broadband transmission in a high frequency band such as a millimeter wave band. In order to compensate for radio wave attenuation in such a radio wave in a high frequency band, beam forming is used between the base station 200 and the UE 100 to obtain a high beam gain. The base station 200 and the UE 100 establish a beam pair.

The UE 100 performs data communication with the cell C1 (TRP 201 #1) which is serving cell. Specifically, the UE 100 performs data communication with the cell C1 by using a beam corresponding to a transmission configuration indication (TCI) state #1. In addition to the cell C1, the cell C2, which is a non-serving cell, is configured in the UE 100. For example, in the UE 100, an SSB (SS/PBCH Block) for performing beam measurement for the cell C2 and a radio resource for performing data communication with the cell C2 are configured from the cell C1.

The UE 100 reports a result of the beam measurement for the cell C2 to the cell C1. The base station 200 (the DU 202) receives, in the cell C1, the beam measurement result from the UE 100, and activates, based on the beam measurement result, a TCI state #2 corresponding to the beam of the cell C2.

As described above, in the embodiment, in the scenario of multiple TRP transmission, a model is assumed in which the cell C1, which is a serving cell, and the cell C2 belonging to the same frequency (intra frequency) as that of the cell C1 are configured in the UE 100, and the UE 100 performs data communication with the cell C2 while maintaining the cell C1 as a serving cell.

A basic procedure in the assumed scenario according to the embodiment will be described with reference to FIG. 5.

In step S1, the UE 100 receives configuration information from the cell C1 (TRP 201 #1) by, for example, RRC signaling. The configuration information includes a configuration of the SSB used for beam measurement for the cell C2 (TRP 201 #2) and a configuration necessary for using radio resources for transmission and reception of data (including transmission and reception of data with the cell C2). The configuration information may be transmitted from the CU 203 to the UE 100 via the DU 202 and the cell C1 (TRP 201 #1).

In step S2, the UE 100 performs beam measurement on the cell C2 (TRP 201 #2) using the configuration information (particularly, the SSB configuration) received in step S1 (step S2*a*), and transmits a report including the measurement result to the cell C1 (TRP 201 #1) (step S2*b*). The DU 202 receives the beam measurement result via the cell C1 (TRP 201 #1).

In step S3, the DU 202 transmits an instruction to activate the TCI state associated with the cell C2 (TRP 201 #2) to the UE 100 via the cell C1 (TRP 201 #1) based on the beam measurement result received in step S2. Such an activation instruction is performed by signaling of a layer 1 (the PHY layer) and a layer 2 (the MAC layer or the like). In response to the reception of the activation instruction from the cell C1, the UE 100 activates the TCI state associated with the cell C2 (TRP 201 #2). As a result, a beam pair of the UE 100 and the cell C2 (TRP 201 #2) is established.

In step S4, the UE 100 transmits and receives data to and from the cell C2 (TRP 201 #2) using a UE-dedicated channel on the cell C2 (TRP 201 #2). The DU 202 transmits and receives data to and from the UE 100 via the cell C2 (TRP 201 #2). It is noted that the UE 100 is within the coverage of the cell C1 (TRP 201 #1) and receives a broadcast channel (BCCH) and a paging channel (PCH), which are common channels, from the cell C1 (TRP 201 #1).

According to such a scenario and procedure, the UE 100 can switch the data communication from the cell C1 (TRP 201 #1) to the cell C2 (TRP 201 #2) by the beam management in the layer 1 (the PHY layer) and the layer 2 (the MAC layer or the like) without depending on the switching instruction from the upper layer (particularly, the RRC layer) and without performing the handover from the cell C1 (TRP 201 #1) to the cell C2 (TRP 201 #2). That is, a cell that performs data communication can be realized by beam switching by the layer 1 (the PHY layer) and the layer 2 (the MAC layer or the like).

In the above-described scenario, it is considered that the UE 100 needs to adjust the transmission timing of the uplink signal for each of the cell C1 (TRP 201 #1) and the cell C2 (TRP 201 #2). However, the method of adjusting the uplink transmission timing with respect to the cell C2 (TRP 201 #2) is not realized and, as such, there is a concern that the transmission timing of the uplink signal with respect to the cell C2 (TRP 201 #2) cannot be appropriately controlled. In an embodiment to be described later, a method of enabling appropriate control of the transmission timing of the uplink signal with respect to the cell C2 (TRP 201 #2) will be described.

In addition, in the above scenario, a trigger for adjusting the uplink transmission timing for the cell C2 (TRP 201 #2) is not specified. For this reason, there is a concern that the alignment of the uplink transmission timing for the cell C2 (TRP 201 #2) cannot be executed at an appropriate trigger. In an embodiment to be described later, a method of adjusting the transmission timing of the uplink signal for the cell C2 (TRP 201 #2) at an appropriate trigger will be described.

Furthermore, in the above scenario, a case is assumed in which the UE 100 maintains an alignment timer (hereinafter, appropriately referred to as a first alignment timer) that controls a time during which the transmission timing of the uplink signal to the cell C1 (TRP 201 #1) is regarded as being adjusted and an alignment timer (hereinafter, appropriately referred to as a second alignment timer) that controls a time during which the transmission timing of the uplink signal to the cell C2 (TRP 201 #2) is regarded as being adjusted. In this case, since the operation of the UE 100 is not specified, there is a concern that the transmission of the uplink signal to the cell C2 (TRP 201 #2) cannot be appropriately controlled. In the embodiment to be described later, a method of appropriately controlling the transmission of the uplink signal to the cell C2 (TRP 201 #2) will be described.

(Configuration of Communication Apparatus)

Figure 6:
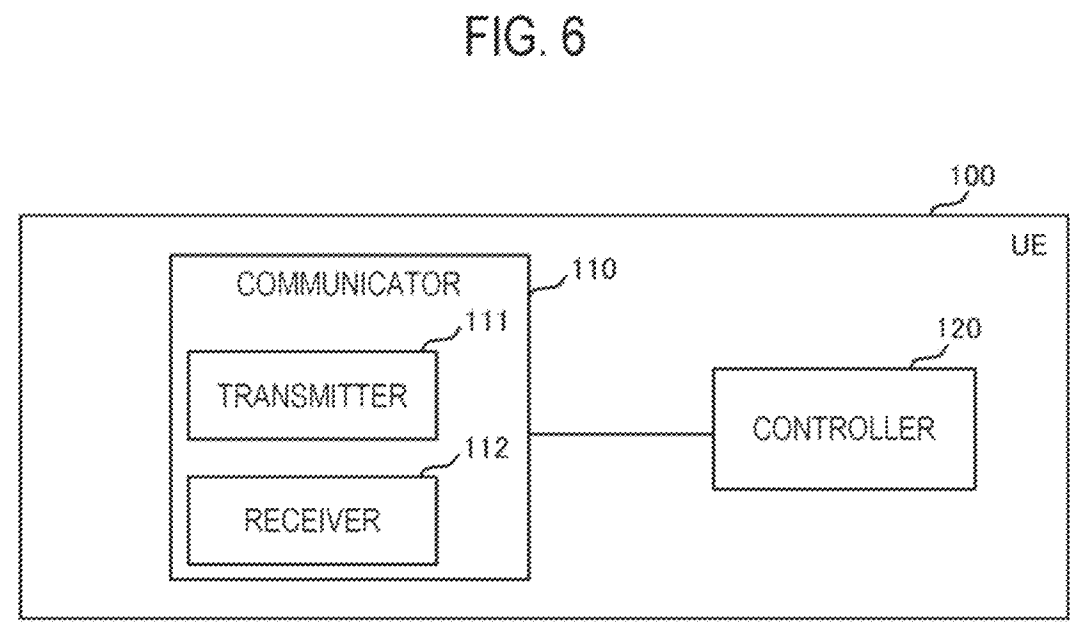

A configuration of the UE 100 according to the embodiment will be described with reference to FIG. 6. The UE 100 includes a communicator 110 and a controller 120.

The communicator 110 performs radio communication with the base station 200 by transmitting and receiving a radio signal to and from the base station 200. The communicator 110 includes at least one transmitter 111 and at least one receiver 112. The transmitter 111 and the receiver 112 may include a plurality of antennas and RF circuits. The antenna converts a signal into a radio wave and emits the radio wave into a space. Furthermore, the antenna receives a radio wave in a space and converts the radio wave into a signal. The RF circuit performs analog processing of the signal transmitted and received via the antenna. The RF circuit may include a high frequency filter, an amplifier, a modulator, a low pass filter, and the like.

The controller 120 performs various types of control in the UE 100. The controller 120 controls communication with the base station 200 via the communicator 110. The operation of the UE 100 described above and described later may be an operation under the control of the controller 120. The controller 120 may include at least one processor capable of executing a program and a memory that maintains the program. The processor may execute the program to perform the operation of the controller 120. The controller 120 may include a digital signal processor that executes digital processing of the signal transmitted and received via the antenna and the RF circuit. The digital processing includes processing of the protocol stack of the RAN. It is noted that the memory maintains the program executed by the processor, a parameter related to the program, and data related to the program. The memory may include at least one of a ROM (Read Only Memory), an EPROM (Erasable Programmable Read Only Memory), an EEPROM (Electrically Erasable Programmable Read Only Memory), a RAM (Random Access Memory), or a flash memory. All or a part of the memory may be included in the processor.

In the embodiment, in the UE 100, the cell C1 (TRP 201 #1) and the cell C2 (TRP 201 #2) are configured by the base station 200 that manages the cell C1 (TRP 201 #1), which is a serving cell, and the cell C2 (TRP 201 #2) belonging to the same frequency as that of the cell C1 (TRP 201 #1). The receiver 112 receives, from the base station 200, an instruction to activate the transmission configuration indication (TCI) state associated with the cell C2 (TRP 201 #2). The controller 120 activates the TCI state in response to the reception of the instruction. The controller 120 adjusts the transmission timing of the uplink signal to the cell C2 (TRP 201 #2) in response to the activation of the TCI state. As a result, the transmission timing of the uplink signal to the cell C2 (TRP 201 #2) can be adjusted at a stage where it is clear that the data communication with the cell C2 (TRP 201 #2) is performed by activating the TCI state. Therefore, it is possible to adjust the transmission timing of the uplink signal to the cell C2 (TRP 201 #2) at an appropriate trigger. As a result, the transmission timing of the uplink signal with respect to the cell C2 (TRP 201 #2) can be appropriately controlled.

In the embodiment, in the UE 100, the cell C1 (TRP 201 #1) and the cell C2 (TRP 201 #2) are configured by the base station 200 that manages the cell C1 (TRP 201 #1), which is a serving cell, and the cell C2 (TRP 201 #2) belonging to the same frequency as that of the cell C1 (TRP 201 #1). The transmitter 111 transmits the uplink signal to the cell C1 (TRP 201 #1) by using a first resource related to the transmission of the uplink signal to the cell C1 (TRP 201 #1), and transmits the uplink signal to the cell C2 (TRP 201 #2) by using a second resource related to the transmission of the uplink signal to the cell C2 (TRP 201 #2). The controller 120 maintains the first alignment timer that controls the time during which the transmission timing of the uplink signal to the cell C1 (TRP 201 #1) is regarded as being adjusted. When the first alignment timer expires, the controller 120 releases the first resource and also releases the second resource.

The UE 100 acquires control information such as broadcast information and paging through communication with the cell C1 (TRP 201 #1), and thus cannot acquire the control information such as the broadcast information and the paging when the first resource is released. As a result, there is a concern that the UE 100 may not be able to appropriately control communication with the cell C2 (TRP 201 #2) and may not be able to normally continue communication with the cell C2 (TRP 201 #2). Therefore, when the first alignment timer expires, the UE 100 releases the first resource and also releases the second resource. Accordingly, when the transmission timing of the uplink signal to the cell C2 (TRP 201 #2) cannot be appropriately controlled, and the communication with the cell C2 (TRP 201 #2) cannot be normally continued, the UE does not communicate with the cell C2 (TRP 201 #2). Therefore, when communication with the cell C2 (TRP 201 #2) can be appropriately controlled, the transmission of the uplink signal to the cell C2 (TRP 201 #2)

can be appropriately controlled by performing communication with the cell C2 (TRP 201 #2).

(Configuration of Base Station)

A configuration of the base station 200 according to the embodiment will be described with reference to FIG. 7. The base station 200 includes a plurality of TRPs 201 (in the example of FIG. 7, TRP 201 #1 and TRP 201 #2), a communicator 210, a network interface 220, and a controller 230.

Each TRP 201 includes a plurality of antennas and has beamforming capability. The TRP 201 may be referred to as a panel or an antenna panel. The antenna converts a signal into a radio wave and emits the radio wave into a space. Furthermore, the antenna receives a radio wave in a space and converts the radio wave into a signal. The respective TRPs 201 are dispersedly disposed and constitute cells.

For example, the communicator 210 receives a radio signal from the UE 100 and transmits a radio signal to the UE 100. The communicator 210 includes at least one transmitter 211 and at least one receiver 212. The transmitter 211 and the receiver 212 may include an RF circuit. The RF circuit performs analog processing of the signal transmitted and received via the antenna. The RF circuit may include a high frequency filter, an amplifier, a modulator, a low pass filter, and the like.

The network interface 220 transmits and receives a signal to and from a network. The network interface 220 receives, for example, a signal from a neighboring base station connected via an Xn interface, which is an interface between base stations, and transmits the signal to the neighboring base station. In addition, the network interface 220 receives, for example, a signal from the core network apparatus 300 connected via the NG interface, and transmits the signal to the core network apparatus 300.

The controller 230 performs various types of control in the base station 200. The controller 230 controls, for example, communication with the UE 100 via the communicator 210. Furthermore, the controller 230 controls, for example, communication with a node (for example, the neighboring base station and the core network apparatus 300) via the network interface 220. The operation of the base station 200 described above and described later may be an operation under the control of the controller 230. The controller 230 may include at least one processor capable of executing a program and a memory that maintains the program. The processor may execute the program to perform the operation of the controller 230. The controller 230 may include a digital signal processor that executes digital processing of a signal transmitted and received via the antenna and the RF circuit. The digital processing includes processing of the protocol stack of the RAN. It is noted that the memory maintains the program executed by the processor, a parameter related to the program, and data related to the program. All or a part of the memory may be included in the processor.

It is noted that, when the base station 200 is separated into the DU 202 and the CU 203, the communicator 210 may be provided in the DU 202, and the controller 230 may be provided in the DU 202 and/or the CU 203.

System Operation

(1) First Operation Example

Figure 8:
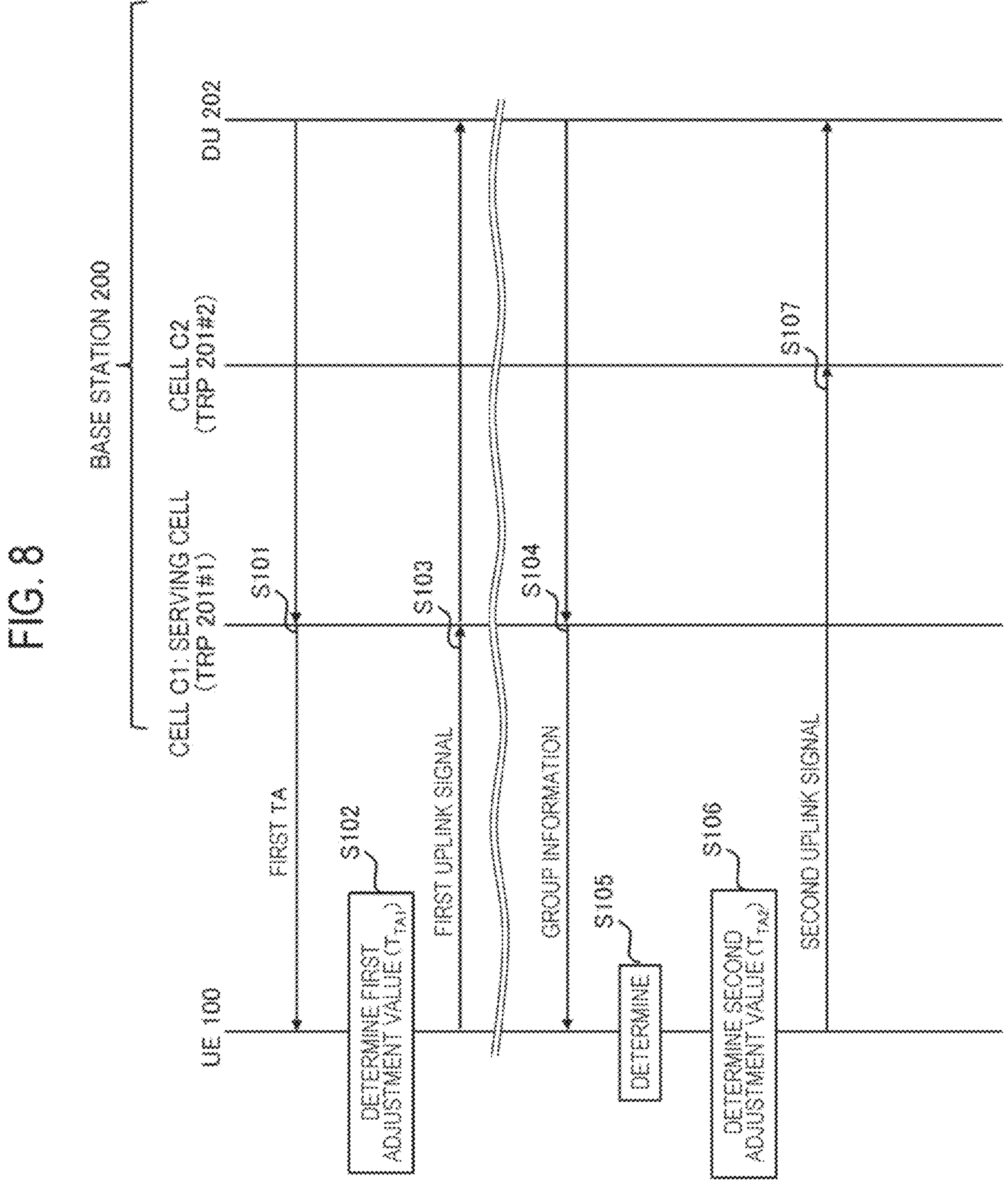
FIG. 8 is a diagram illustrating a sequence of a first operation example in the mobile communication system according to the embodiment.

A first operation example in the mobile communication system 1 will be described with reference to FIGS. 8 and 9. In the first operation example, the UE 100 adjusts the transmission timing of the uplink signal to the cell C2 based on group information indicating that the cell C1 (TRP 201 #1) and the cell C2 (TRP 201 #2) belong to the same timing advance group.

In step S101, the base station 200 (the transmitter 211) transmits a first timing advance (a first TA) for adjusting the transmission timing of the uplink signal to the cell C1 (TRP 201 #1) to the UE 100 in the cell C1 (TRP 201 #1). The UE 100 (the receiver 112) receives the first TA from the cell C1 (TRP 201 #1).

The base station 200 (the transmitter 211) may transmit the first TA by the MAC CE, or may transmit the first TA by a response (an RA response) to the random access (RA) preamble from the UE 100 in the random access.

In step S102, the UE 100 (the controller 120) determines a first alignment value ($T_{TA1}$). The first alignment value ($T_{TA1}$) for adjusting a transmission timing (hereinafter, appropriately referred to as a first transmission timing) of the uplink signal (hereinafter, appropriately referred to as a first uplink signal) to the cell C1 (TRP 201 #1) is determined.

The UE 100 (the controller 120) calculates the first TA value ($N_{TA1}$) based on the first TA ($T_{A1}$) using, for example, Equation 2 or Equation 3. In addition, the UE 100 (the controller 120) may determine a first offset value ($N_{TA,\ offset}$) to be added to the first TA value. The UE 100 (the controller 120) may determine the first alignment value ($T_{TA1}$) using the first TA value and the determined first offset value using the above-described Equation 1.

The UE 100 (the controller 120) uses a downlink timing from the cell C1 (TRP 201 #1) as a timing reference (hereinafter, appropriately referred to as a first timing reference) of the first uplink transmission. As illustrated in FIG. 9, the UE 100 (the controller 120) determines a timing shifted by the first alignment value ($T_{TA1}$) determined from the first timing reference as the first transmission timing.

In step S103, the UE 100 (the transmitter 111) transmits the first uplink signal to the cell C1 (TRP 201 #1) at the determined first transmission timing. The base station 200 (the receiver 212) receives the uplink signal in the cell C1 (TRP 201 #1). Thereafter, the base station 200 (the controller 230) initiates an operation for the UE 100 to perform data communication with the cell C2 (TRP 201 #2) while maintaining the cell C1 (TRP 201 #1) as a serving cell.

The base station 200 (the controller 230) determines whether the cell C1 (TRP 201 #1) and the cell C2 (TRP 201 #2) belong to the same timing advance group.

For example, when both of the following conditions (a) and (b) are fulfilled, the base station 200 (the controller 230) may determine that the cell C1 (TRP 201 #1) and the cell C2 (TRP 201 #2) belong to the same timing advance group. When at least one of the conditions (a) and (b) is not fulfilled, the base station 200 (the controller 230) may determine that the cell C1 (TRP 201 #1) and the cell C2 (TRP 201 #2) belong to different timing advance groups.

(a) A case in which the first TA is applicable as a second alignment value ($T_{TA2}$) for adjusting a transmission timing (hereinafter, appropriately referred to as a second transmission timing) of an uplink signal (hereinafter, appropriately referred to as a second uplink signal) to the cell C2 (TRP 201 #2)

(b) A case in which the first timing reference can be used as the timing reference when adjusting the second transmission timing The base station 200 (the controller 230) generates group information indicating whether the cell C1 (TRP 201 #1) and the cell C2 (TRP 201 #2) belong to the same timing advance group based on the determination result. In the group information, for example, whether the cell C1 (TRP 201 #1) and the cell C2 (TRP 201 #2) belong to the same timing advance group may be indicated by configuring a timing advance group identifier for each cell. For example, in the group information, when the cell C1 (TRP 201 #1) is associated with a timing advance group identifier #1, and the cell C2 (TRP 201 #2) is associated with the timing advance group identifier #1, the group information may indicate that the cell C1 (TRP 201 #1) and the cell C2 (TRP 201 #2) belong to the same timing advance group. For example, in the group information, when the cell C1 (TRP 201 #1) is associated with the timing advance group identifier #1, and the cell C2 (TRP 201 #2) is associated with a timing advance group identifier #2, the group information may indicate that the cell C1 (TRP 201 #1) and the cell C2 (TRP 201 #2) belong to the different timing advance groups. In the present operation example, a description will be given on the assumption that the base station 200 (the controller 230) determines that the cell C1 (TRP 201 #1) and the cell C2 (TRP 201 #2) belong to the same timing advance group. Therefore, the group information indicates that the cell C1 (TRP 201 #1) and the cell C2 (TRP 201 #2) belong to the same timing advance group.

In step S104, the base station 200 (the transmitter 211) transmits the group information to the UE 100 in the cell C1 (TRP 201 #1). The UE 100 (the receiver 112) receives the group information from the cell C1 (TRP 201 #1).

Figure 5:
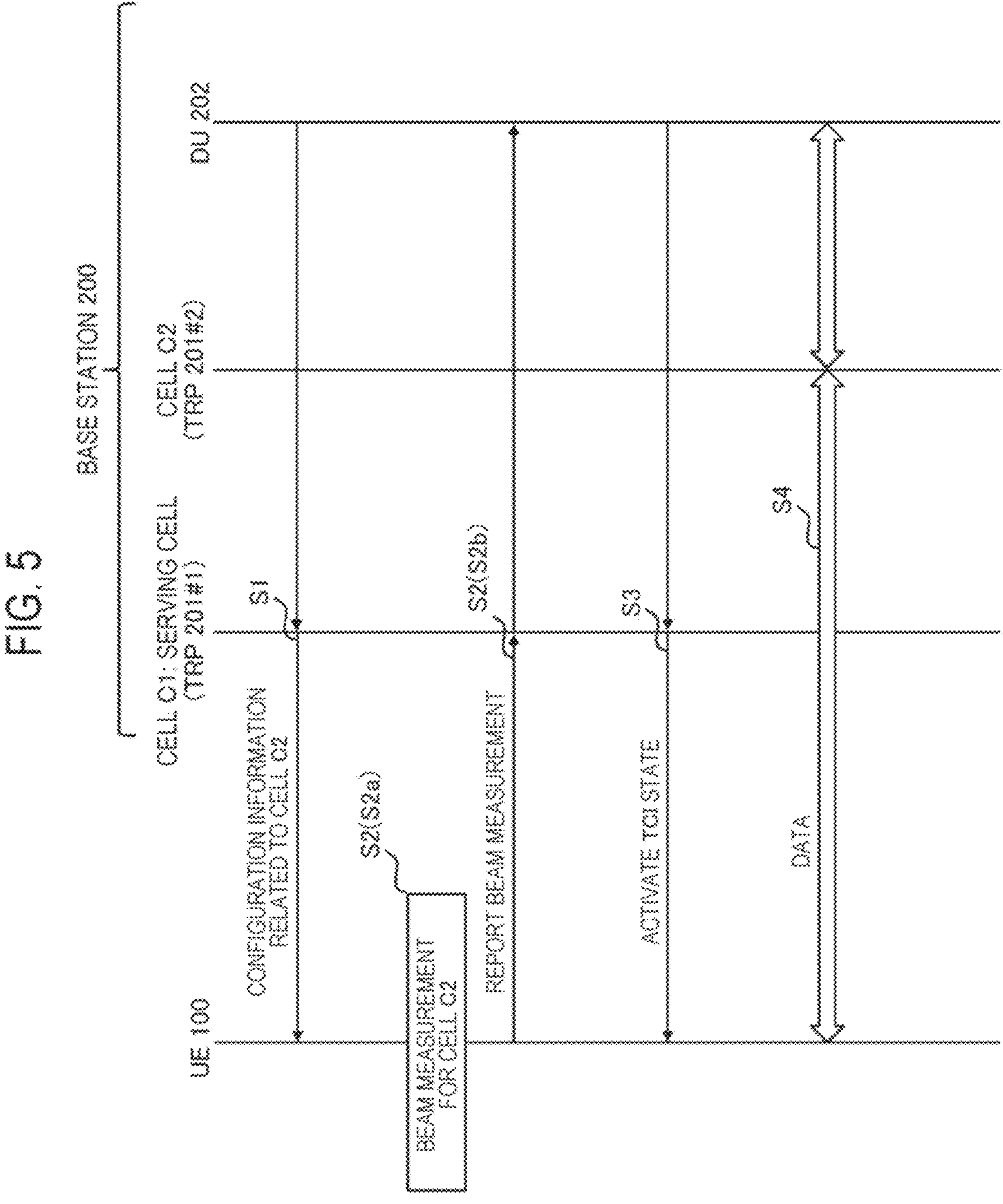
FIG. 5 is a diagram illustrating a basic procedure in the assumed scenario according to the embodiment.

The base station 200 (the transmitter 211) may transmit the group information to the UE 100 in the cell C1 (TRP 201 #1) during step S1 to step S4 in the procedure illustrated in FIG. 5. The base station 200 (the transmitter 211) may transmit, to the UE 100, configuration information including, for example, the group information and beam measurement configuration information for configuring a beam measurement reference signal used for beam measurement for the cell C2 (TRP 201 #2). The UE 100 (the receiver 112) receives the group information and the beam measurement configuration information from the cell C1 (TRP 201 #1). As a result, the UE 100 can determine whether the second transmission timing can be adjusted using the first TA as described later before transmitting and receiving data to and from the cell C2 (TRP 201 #2) (that is, step S4 in FIG. 5). In addition, signaling between the UE 100 and the base station 200 can be reduced as compared with a case in which the group information and the beam measurement configuration information are separately transmitted.

The beam measurement configuration information includes reference signal information indicating an SSB or a channel state information reference signal (CSI-RS) transmitted by the cell C2 (TRP 201 #2).

It is noted that the base station 200 (the transmitter 211) may transmit the group information to the UE 100 in the cell C2 (TRP 201 #2). The UE 100 (the receiver 112) may receive the group information from the cell C2 (TRP 201 #2).

The UE 100 (the controller 120) adjusts, based on the group information, the transmission timing of the uplink signal to the cell C2 (TRP 201 #2). For example, the UE 100 performs the following operation.

In step S105, the UE 100 (the controller 120) determines, based on the group information, whether the cell C1 (TRP 201 #1) and the cell C2 (TRP 201 #2) belong to the same timing advance group.

In the present operation example, since the group information indicates that the cell C1 (TRP 201 #1) and the cell C2 (TRP 201 #2) belong to the same timing advance group, the UE 100 (the controller 120) determines that the cell C1 (TRP 201 #1) and the cell C2 (TRP 201 #2) belong to the same timing advance group.

In step S106, the UE 100 (the controller 120) determines the second alignment value ($T_{TA2}$) for adjusting the second transmission timing.

In a case where it is indicated that the cell C1 (TRP 201 #1) and the cell C2 (TRP 201 #2) belong to the same timing advance group, the UE 100 (the controller 120) may adjust the second transmission timing using the first TA. That is, the UE 100 (the controller 120) may determine the second alignment value using the first TA. The UE 100 (the controller 120) may use the first alignment value as the second alignment value. Accordingly, since the UE 100 does not need to acquire, from the base station 200, a second timing advance (hereinafter, appropriately referred to as a second TA) different from the first TA, it is possible to reduce signaling between the UE 100 and the base station 200.

When determining the second alignment value, the UE 100 (the controller 120) may use the first TA as the second TA and use the first offset value determined in step S102 as a second offset value ($N_{TA,\ offset}$). As a result, the UE 100 can omit, for example, processing of determining the second offset value using Table 1. As a result, the processing load of the UE 100 can be reduced.

Figure 9:
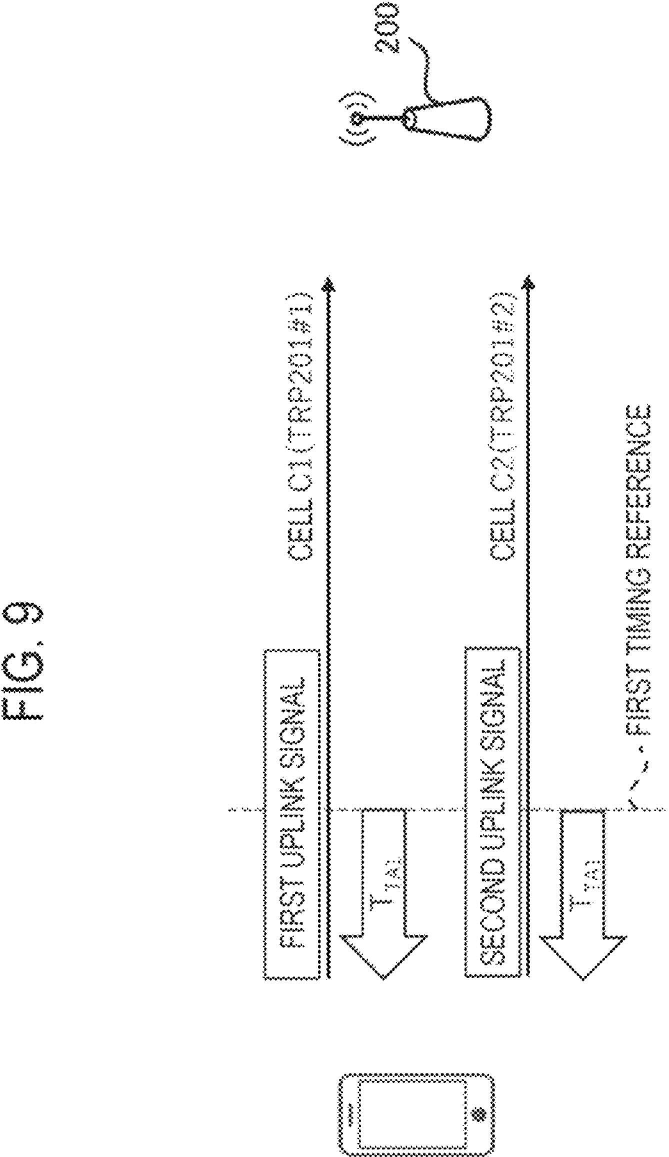
FIG. 9 is an explanatory diagram illustrating the first operation example in the mobile communication system according to the embodiment.

As illustrated in FIG. 9, in a case where it is indicated that the cell C1 (TRP 201 #1) and the cell C2 (TRP 201 #2) belong to the same timing advance group, the UE 100 (the controller 120) may adjust the second transmission timing using the first timing reference as a timing reference (hereinafter, appropriately referred to as a second timing reference) of the second uplink transmission. Therefore, in the UE 100 (the controller 120), the first transmission timing and the second transmission timing may be the same.

It is noted that the UE 100 (the controller 120) may use the downlink timing from the cell C2 (TRP 201 #2) as the second timing reference. Therefore, the UE 100 (the controller 120) may determine a timing shifted from the second timing reference by the determined second alignment value ($T_{TA2}$), that is, the first alignment value ($T_{TA1}$) as the second transmission timing.

In this way, the UE 100 (the controller 120) adjusts the second transmission timing using the first TA.

It is noted that the UE 100 (the controller 120) may manage the first TA value and the second TA value independently. That is, the UE 100 (the controller 120) may maintain the first TA value and the second TA value, respectively.

When receiving a first MAC CE including the first TA as the TA command from the base station 200, the UE 100 (the controller 120) may manage the first TA value based on the first MAC CE. That is, the UE 100 (the controller 120) updates the first TA value based on the first TA, and maintains the updated first TA value. On the other hand, when receiving a second MAC CE including the second TA as the TA command from the base station 200, the UE 100 (the controller 120) may manage the second TA value independently of the first TA value based on the second MAC CE. The UE 100 (the controller 120) updates the second TA value based on the second TA, and maintains the updated second TA value.

In addition, the UE 100 (the controller 120) may independently manage the first alignment value and the second alignment value. The UE 100 (the controller 120) may independently manage information related to the alignment of the transmission timing of the uplink signal for each cell.

In addition, when using the first TA value as the second TA value, the UE 100 (the controller 120) may maintain only the first TA value and may not maintain the second TA value. Similarly, when the first alignment value is used as the second alignment value, the UE 100 (the controller 120) may maintain only the first alignment value and may not maintain the second alignment value.

In step S107, the UE 100 (the transmitter 111) transmits the second uplink signal to the cell C2 (TRP 201 #2) at the determined second transmission timing. The base station 200 (the receiver 212) receives the uplink signal in the cell C2 (TRP 201 #2).

It is noted that, when receiving the MAC CE including the first TA as the TA command from the base station 200, the UE 100 (the controller 120) can adjust, using the first TA, the second transmission timing in addition to the first transmission timing.

(2) Second Operation Example

Figure 10:
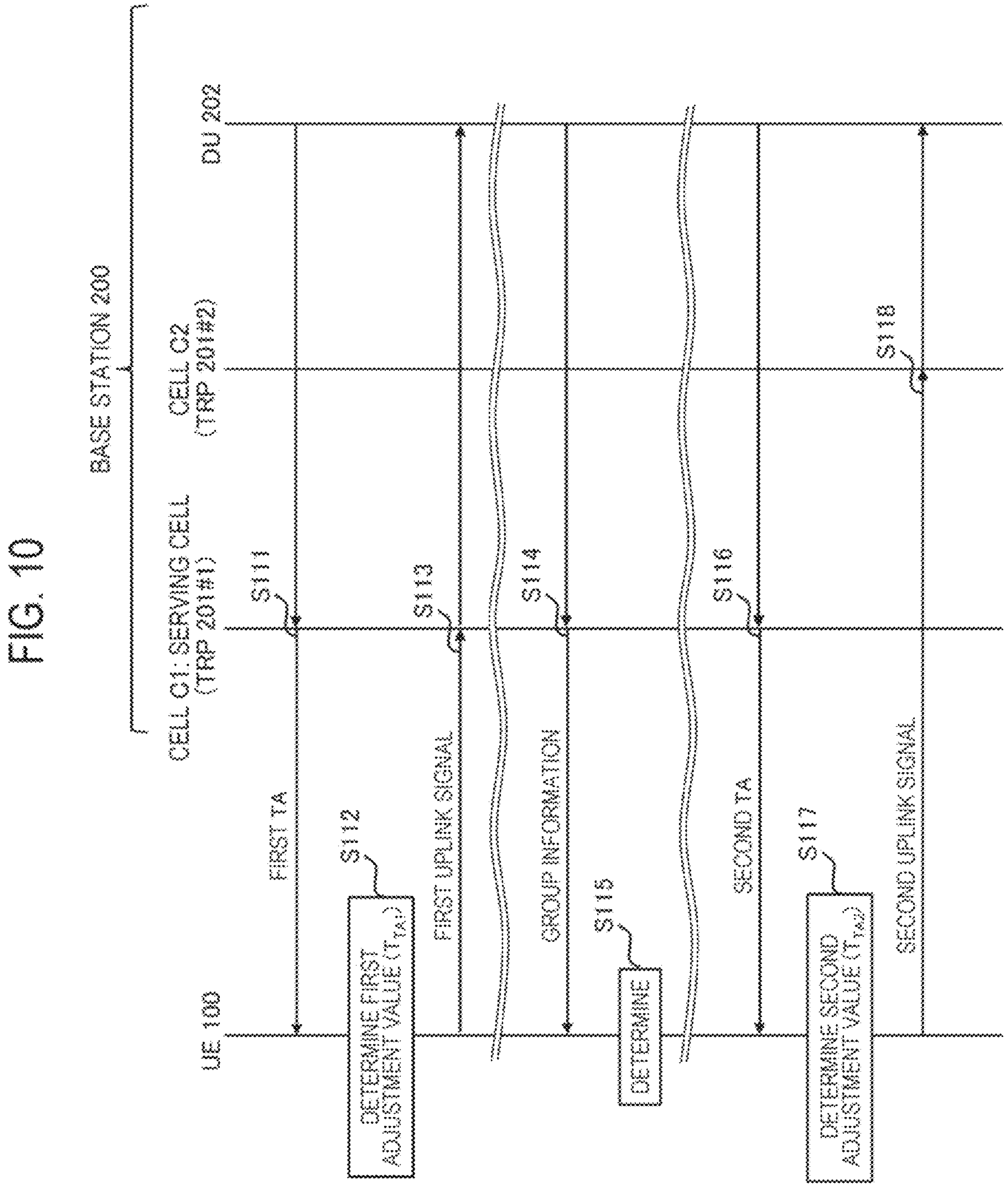
FIG. 10 is a diagram illustrating a sequence of a second operation example in the mobile communication system according to the embodiment.

With reference to FIGS. 10 and 11, a second operation example in the mobile communication system 1 will be described focusing on differences from the above-described operation example. In the second operation example, a description will be given as to a case in which the cell C1 (TRP 201 #1) and the cell C2 (TRP 201 #2) belong to different timing advance groups.

The operation from step S111 to step S115 is similar to the above-described operation example. It is noted that, in the present operation example, the base station 200 (the controller 230) generates group information indicating whether the cell C1 (TRP 201 #1) and the cell C2 (TRP 201 #2) belong to the same timing advance group. The base station 200 (the controller 230) transmits the generated group information to the UE 100 in the cell C1 (TRP 201 #1).

The UE 100 (the controller 120) determines, based on the group information, that the cell C1 (TRP 201 #1) and the cell C2 (TRP 201 #2) belong to different timing advance groups.

The UE 100 (the controller 120) may perform an operation for acquiring the second TA. The UE 100 (the controller 120) may perform, for example, random access to the cell C2 (TRP 201 #2). In the random access, the UE 100 (the transmitter 111) may transmit the random access (RA) preamble to the cell C2 (TRP 201 #2). In step S116, the base station 200 (the transmitter 211) transmits the second timing advance (the second TA) for adjusting the second transmission timing to the UE 100 in the cell C1 (TRP 201 #1). The UE 100 (the receiver 112) receives the second TA from the cell C1 (TRP 201 #1).

The base station 200 (the transmitter 211) may transmit the second TA by the MAC CE, or may transmit the second TA by the response (the RA response) to the random access (RA) preamble from the UE 100 in the random access. The UE 100 (the receiver 112) may receive the second TA from the cell C2 (TRP 201 #2). By receiving TA (the second TA) used for transmission of the second uplink signal from a cell of a transmission destination of the second uplink signal, it is possible to easily grasp the TA to be applied.

In step S117, the UE 100 (the controller 120) determines the second alignment value ($T_{TA2}$) for adjusting the second transmission timing.

The UE 100 (the controller 120) calculates the second TA value ($N_{TA2}$) based on the second TA ($T_{A2}$) using, for example, Equation 2 or Equation 3 described above.

The UE 100 (the controller 120) may determine the second offset value ($N_{TA,\ offset}$) to be added to the second TA value. The UE 100 (the controller 120) may use the first offset value determined when adjusting the first transmission timing as the second offset value. The UE 100 may use the first offset value as the second offset value while independently managing the first TA value ($N_{TA1}$) and the second TA value ($N_{TA2}$). As a result, the UE 100 can omit, for example, processing of determining the second offset value using Table 1. As a result, the processing load of the UE 100 can be reduced.

The UE 100 (the controller 120) may (i) use the first offset value as the second offset value regardless of whether the first TA value and the second TA value are the same, (ii) use the first offset value as the second offset value regardless of whether the first alignment value and the second alignment value are the same, (iii) use the first offset value as the second offset value regardless of whether the first timing reference and the second timing reference are the same, and (iv) use the first offset value as the second offset value regardless of whether the adjusted transmission timings of the uplink signals are the same. Therefore, when the cell C2 (TRP 201 #2) is configured together with the cell C1 (TRP 201 #1), the UE 100 can apply the same offset value ($N_{TA,\ offset}$) to both cells.

The UE 100 (the controller 120) may determine the second alignment value ($T_{TA2}$) using the calculated second TA value and the determined second offset value by using the above-described Equation 1.

When the group information indicates that the cell C1 (TRP 201 #1) and the cell C2 (TRP 201 #2) belong to different timing advance groups, the UE 100 (the controller 120) may adjust the second transmission timing by using the downlink timing from the cell C2 (TRP 201 #2) as the second timing reference. Specifically, as illustrated in FIG. 11, the UE 100 (the controller 120) determines a timing shifted from the second timing reference by the determined second alignment value ($T_{TA2}$) as the second transmission timing. In this way, the UE 100 (the controller 120) adjusts the second transmission timing using the second TA. As a result, the network can flexibly configure the second transmission timing of the UE 100 (the controller 120).

The operation of step S118 is similar to the above-described operation example.

(3) Third Operation Example

Figure 12:
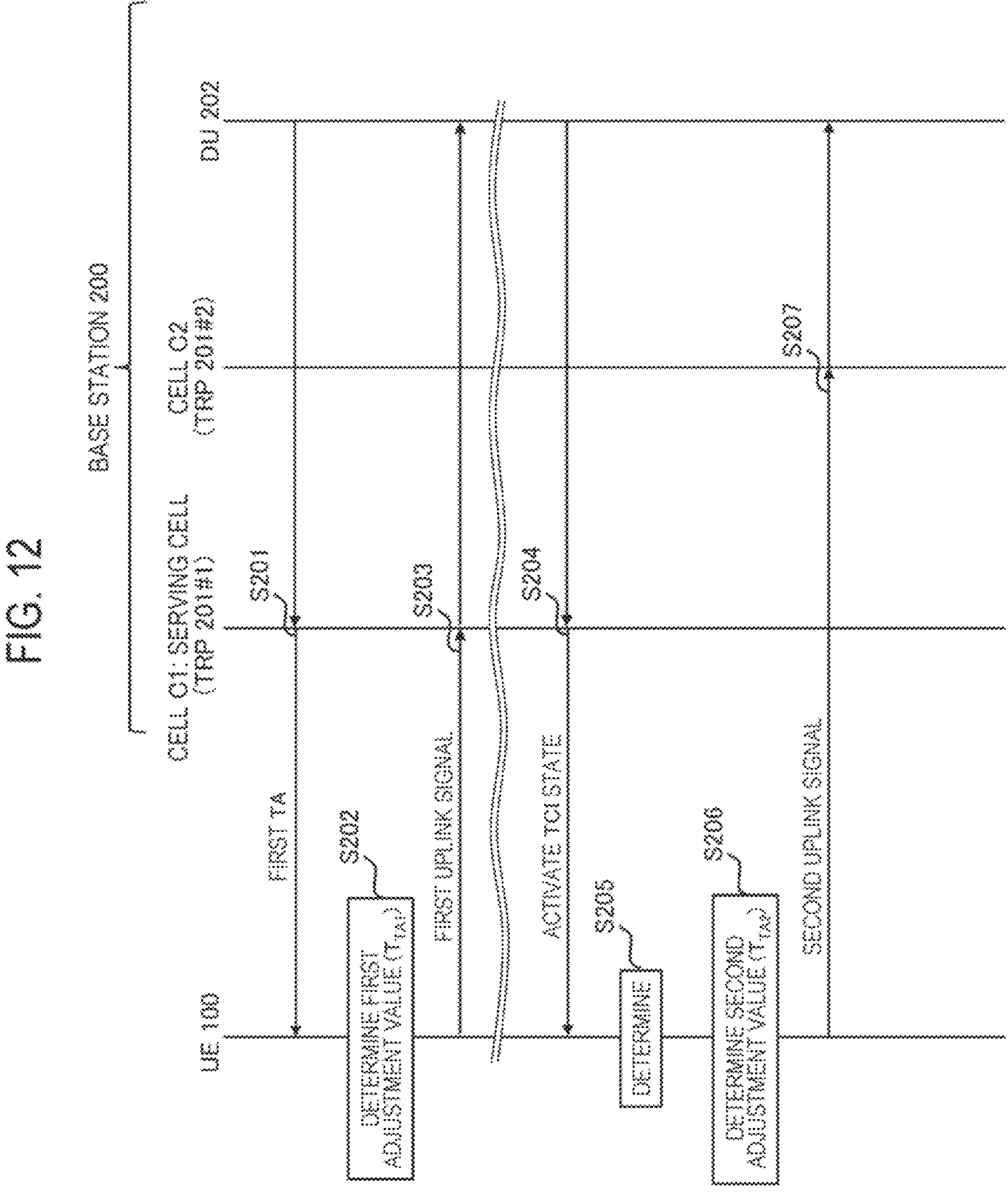
FIG. 12 is a diagram illustrating a sequence of a third operation example in the mobile communication system according to the embodiment.

With reference to FIG. 12, a third operation example in the mobile communication system 1 will be described focusing on differences from the above-described operation example. In the third operation example, a description will be given as to a case in which the UE 100 adjusts the transmission timing of the uplink signal to the cell C2 (TRP 201 #2) in response to the activation of the TCI state. In the present operation example, the UE 100 (the controller 120) adjusts the second transmission timing using the first TA.

The operation from step S201 to step S203 is similar to the above-described operation example.

In step S204, the base station 200 (the transmitter 211) transmits an activation instruction to activate the TCI state associated with the cell C2 (TRP 201 #2) to the UE 100 in the cell C1 (TRP 201 #1). The UE 100 (the receiver 112) receives the activation instruction from the cell C1 (TRP 201 #1). It is noted that the activation instruction may include the group information.

The UE 100 (the controller 120) activates the TCI state in response to the reception of the activation instruction. In addition, the UE 100 (the controller 120) adjusts the second transmission timing of the uplink signal to the cell C2 (TRP 201 #2) in response to the activation of the TCI state.

Therefore, the UE 100 (the controller 120) may start the following operation in response to the activation of the TCI state.

In step S205, the UE 100 (the controller 120) determines, based on the group information, whether the cell C1 (TRP 201 #1) and the cell C2 (TRP 201 #2) belong to the same timing advance group, similarly to the above-described operation example. In the present operation example, the UE 100 (the controller 120) determines that the cell C1 (TRP 201 #1) and the cell C2 (TRP 201 #2) belong to the same timing advance group.

Alternatively, the UE 100 (the controller 120) may determine whether to adjust the second transmission timing using the first TA or adjust the second transmission timing using the second TA. In the present operation example, the UE 100 (the controller 120) determines to adjust the second transmission timing using the first TA.

Alternatively, the UE 100 (the controller 120) may perform the operation of adjusting the second transmission timing (that is, the operation in step S106 in the first operation example) using the first TA without performing the above determination.

In step S206, the UE 100 (the controller 120) determines the second alignment value ($T_{TA2}$) for adjusting the second transmission timing, similarly to the above-described operation example. That is, the UE 100 (the controller 120) adjusts the second transmission timing using the first TA.

The operation in step S207 is similar to the above-described operation example.

According to the above description, the UE 100 can adjust the transmission timing of the uplink signal with respect to the cell C2 (TRP 201 #2) at an appropriate trigger. As a result, the transmission timing of the uplink signal with respect to the cell C2 (TRP 201 #2) can be appropriately controlled.

(4) Fourth Operation Example

Figure 14:
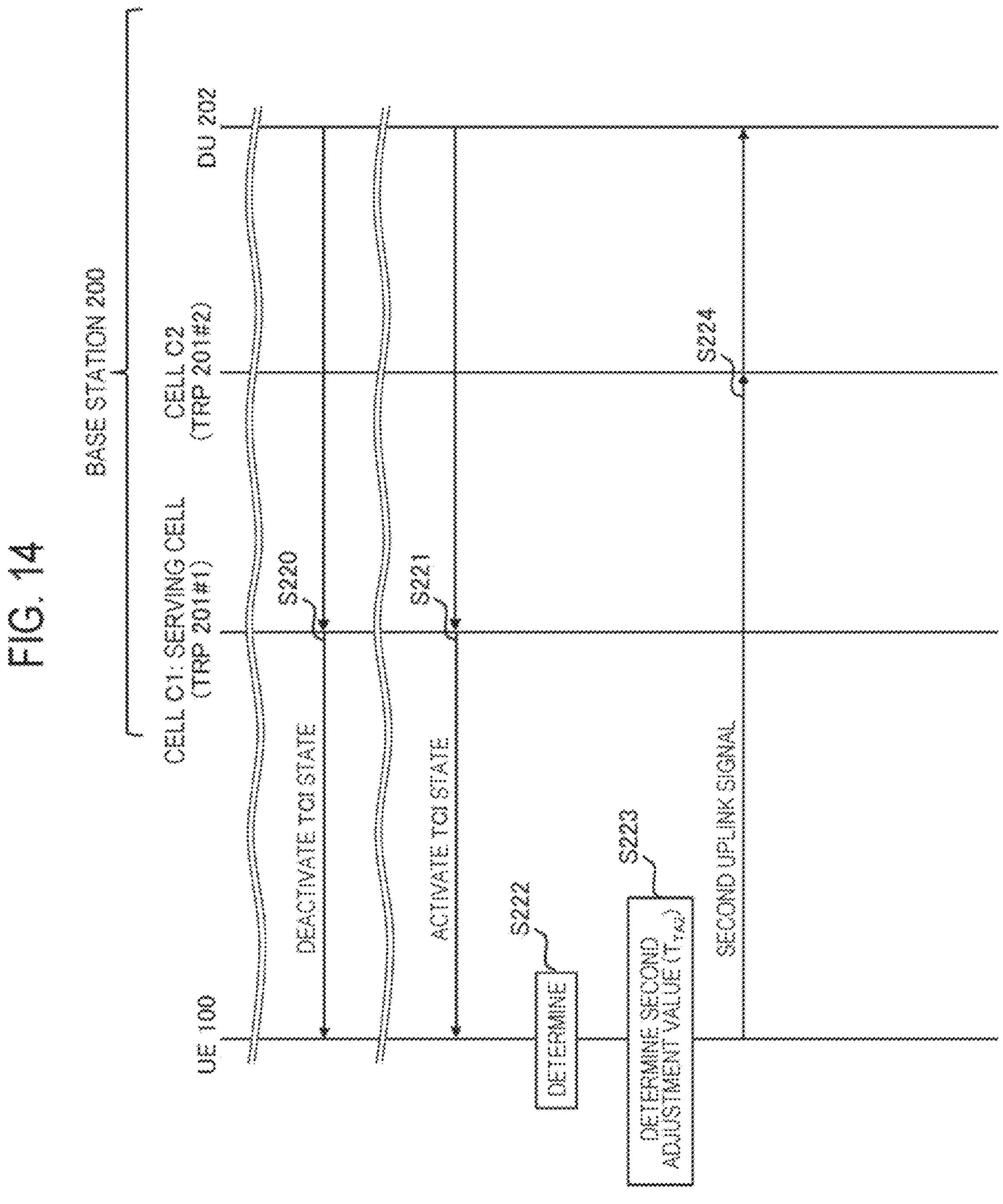
FIG. 14 is a diagram illustrating a sequence (part 2) of the fourth operation example in the mobile communication system according to the embodiment.

With reference to FIGS. 13 and 14, a fourth operation example in the mobile communication system 1 will be described focusing on differences from the above-described operation example. In the fourth operation example, similarly to the third operation example, the transmission timing of the uplink signal to the cell C2 (TRP 201 #2) is adjusted according to the activation of the TCI state by the UE 100. In the present operation example, the UE 100 (the controller 120) adjusts the second transmission timing using the second TA.

In FIG. 13, the operation from step S211 to step S215 is similar to the above-described operation example. In the present operation example, the UE 100 (the controller 120) determines that the cell C1 (TRP 201 #1) and the cell C2 (TRP 201 #2) belong to different timing advance groups. Furthermore, in the present operation example, the UE 100 (the controller 120) may determine to adjust the second transmission timing using the second TA.

Alternatively, the UE 100 (the controller 120) may execute subsequent operations without making the above determination.

When adjusting the second transmission timing using the second TA, the UE 100 (the controller 120) may determine whether the second TA is maintained therein. When the second TA is not maintained therein, the UE 100 (the controller 120) may execute the processing in step S216. On the other hand, when the second TA is maintained therein, the UE 100 (the controller 120) may execute the processing in step S218 without executing the processing in step S216.

Here, the UE 100 (the controller 120) may maintain a second alignment timer (timeAlignmentTimer) that controls a time during which the transmission timing of the uplink signal to the cell C2 (TRP 201 #2) is regarded as being adjusted. For example, when receiving the second TA from the base station 200, the UE 100 (the controller 120) may start (or restart) the second alignment timer.

The UE 100 (controller 120) adjusts the second transmission timing using the second TA value within a designated time after receiving the second TA from the base station 200. The UE 100 (the controller 120) may measure the designated time using the second alignment timer. The UE 100 (the controller 120) may maintain the second TA value when the second alignment timer expires.

It is noted that the UE 100 (the controller 120) may maintain a first alignment timer (timeAlignmentTimer) that controls a time during which the transmission timing of the uplink signal to the cell C1 (TRP 201 #1) is regarded as being adjusted.

In the present operation example, a description will proceed on the assumption that the UE 100 (the controller 120) does not maintain the second TA value. In a case where the second TA value is not maintained in the UE 100 when the TCI state is activated, the UE 100 (the controller 120) may perform the random access (RA) to the cell C2 (TRP 201 #2) in order to acquire the second TA. Therefore, the UE 100 (the controller 120) may perform control to initiate the following operation. As a result, the UE 100 can acquire the second TA and calculate the second TA value.

In step S216, the UE 100 (the transmitter 111) transmits a RA preamble to the cell C2 (TRP 201 #2). The base station 200 (the receiver 212) receives the RA preamble in the cell C1 (TRP 201 #1). It is noted that RA preamble transmission is referred to as Msg1 in an RA procedure.

The base station 200 (the controller 230) generates an RA response in response to reception of the RA preamble. The base station 200 (the controller 230) includes the second TA in the RA response.

It is noted that the base station 200 (the controller 230) may allocate, to the UE 100, the RA resource to be used for the RA with respect to the cell C2 (TRP 201 #2). The base station 200 (the transmitter 211) may transmit, to the UE 100 in the cell C1 (TRP 201 #1), information indicating the RA resource allocated to the UE 100 before step S216.

In the RA resource, a dedicated RA preamble may be an RA preamble that is exclusively allocated to the UE 100 from the RA preamble group prepared for the cell C2 (TRP 201 #2) and does not compete with other UEs 100 in the RA with respect to the cell C2 (TRP 201 #2). Alternatively, the RA resource may be one or a plurality of RA resources (a CBRA preamble group) available for CBRA with respect to the cell C2 (TRP 201 #2). The preamble included in the CBRA preamble group is an RA preamble that can compete with other UEs 100.

In step S217, the base station 200 (the transmitter 211) transmits the RA response to the UE 100 in the cell C1 (TRP 201 #1). Alternatively, the base station 200 (the transmitter 211) may transmit the RA response to the UE 100 in the cell C2 (TRP 201 #2). The UE 100 (the receiver 112) receives the RA response from the cell C1 (TRP 201 #1) or the cell C2 (TRP 201 #2). It is noted that RA response transmission is referred to as Msg2 in the RA procedure.

The operations in steps S218 and S219 are similar to those in the above-described operation example.

As illustrated in FIG. 14, in step S220, the base station 200 (the transmitter 211) transmits a deactivation instruction for deactivating the TCI state associated with the cell C2

(TRP 201 #2) to the UE 100 in the cell C1 (TRP 201 #1). The UE 100 (the receiver 112) receives the deactivation instruction from the cell C1 (TRP 201 #1).

The UE 100 (the controller 120) deactivates the TCI state associated with the cell C2 (TRP 201 #2) in response to the deactivation instruction.

It is noted that the UE 100 (the controller 120) may consider that the second alignment timer expires in response to the deactivation of the TCI state. The UE 100 (the controller 120) may discard the second TA when (it is regarded that) the second alignment timer expires.

Step S221 is the same operation as step S214.

Step S222 is the same operation as step S215. The UE 100 (the controller 120) may determine whether the second TA value is maintained therein. In the present operation example, the description will proceed on the assumption that the UE 100 (the controller 120) determines that the second TA value is maintained.

The UE 100 (the controller 120) executes the processing in step S223 without executing the same processing as the processing in step S216.

Steps S223 and S224 are similar to the above-described operation example.

The UE 100 (the controller 120) adjusts the second transmission timing using the second TA value. As a result, the UE 100 can omit the operation for acquiring the second TA, and can reduce signaling between the UE 100 and the base station 200.

According to the above description, the UE 100 can adjust the transmission timing of the uplink signal with respect to the cell C2 (TRP 201 #2) at an appropriate trigger. As a result, the transmission timing of the uplink signal with respect to the cell C2 (TRP 201 #2) can be appropriately controlled.

(5) Fifth Operation Example

Figure 15:
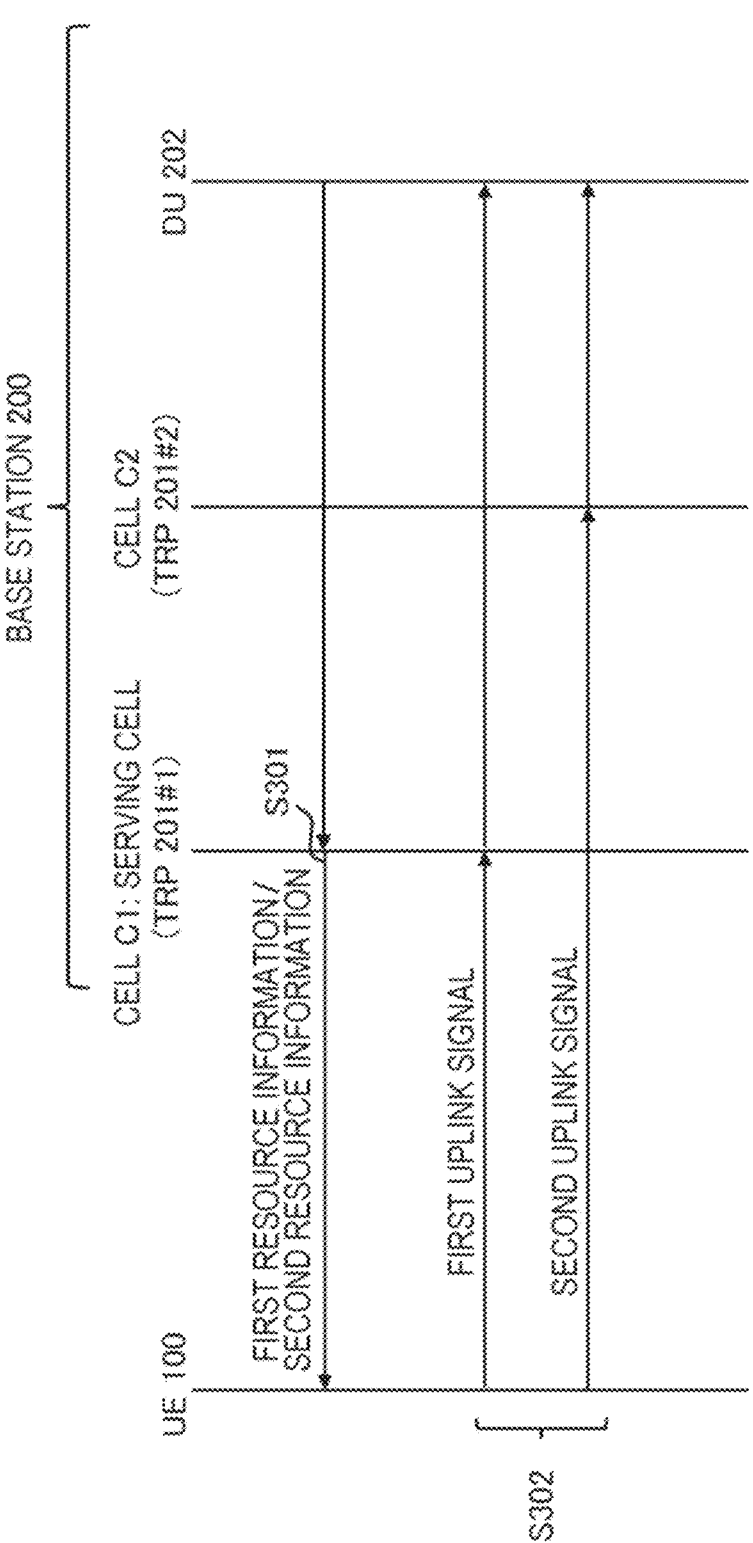
FIG. 15 is a diagram illustrating a sequence of a fifth operation example in the mobile communication system according to the embodiment.
Figure 16:
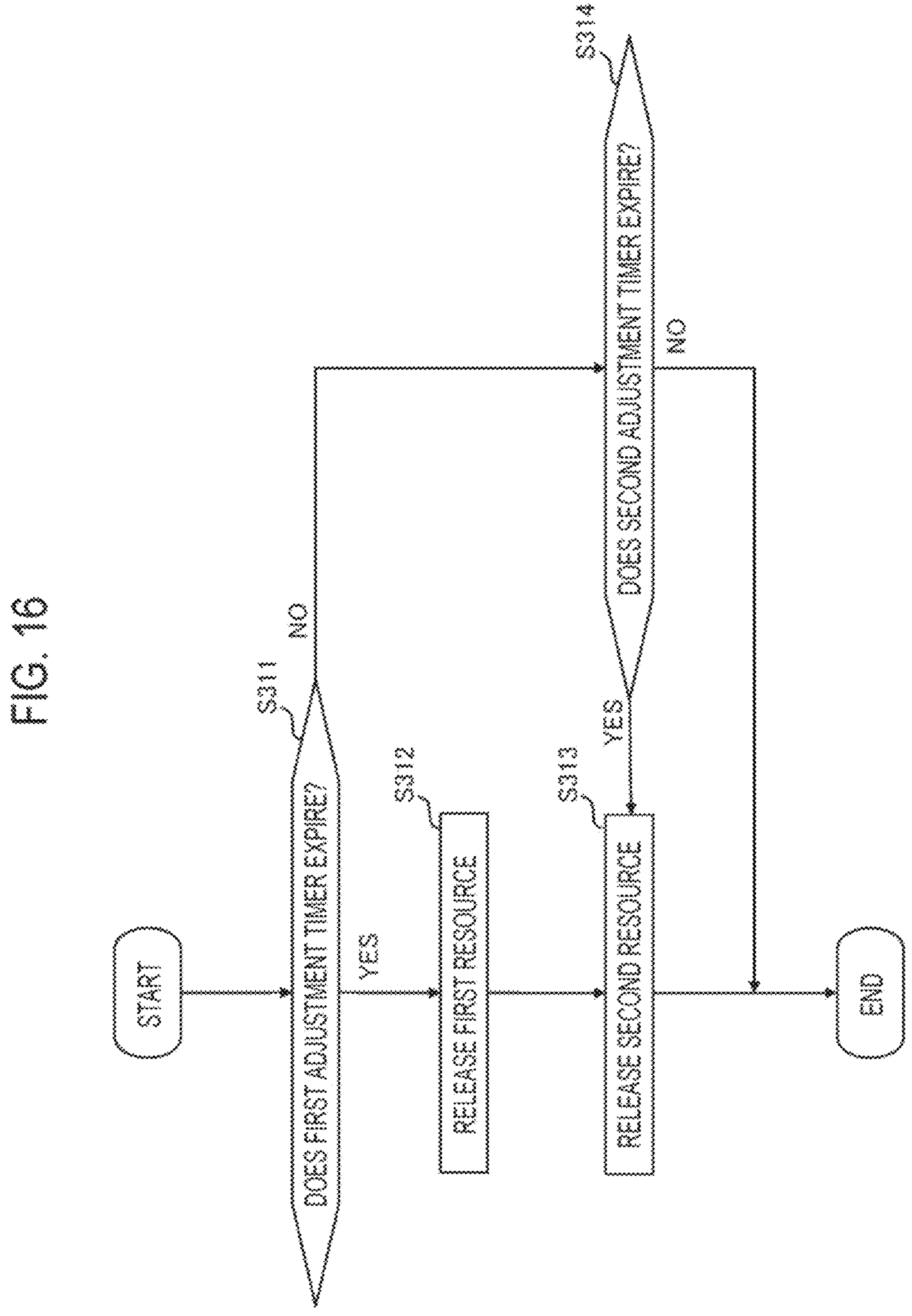
FIG. 16 is a flowchart of the fifth operation example in the mobile communication system according to the embodiment.

With reference to FIGS. 15 and 16, a fifth operation example in the mobile communication system 1 will be described focusing on differences from the above-described operation example.

In FIG. 15, the TCI state associated with the cell C2 (TRP 201 #2) is activated.

In step S301, the base station 200 (the transmitter 211) transmits, to the UE 100 in the cell C1 (TRP 201 #1), first resource information indicating the first resource related to the transmission of the uplink signal to the cell C1 (TRP 201 #1) and second resource information indicating the second resource related to the transmission of the uplink signal to the cell C2 (TRP 201 #2). Alternatively, the base station 200 (the transmitter 211) may transmit the first resource information to the UE 100 in the cell C1 (TRP 201 #1) and transmit the second resource information to the UE 100 in the cell C2 (TRP 201 #2). The UE 100 (the receiver 112) receives the first resource information and the second resource information from the cell C1 (TRP 201 #1). The UE 100 (the receiver 112) may receive the first resource information from the cell C1 (TRP 201 #1) and the second resource information from the cell C2 (TRP 201 #2).

The first resource and the second resource may include at least one of PUCCH configuration information for configuring a physical uplink control channel (PUCCH) in the UE 100, SRS configuration information for configuring a sounding reference signal (SRS) in the UE 100, a downlink allocation allocated for downlink transmission to the UE 100, an uplink grant allocated for uplink transmission to the UE 100, and a PUSCH resource for reporting a semi-persistent channel state information (CSI).

In step S302, the UE 100 (the transmitter 111) transmits the first uplink signal to the cell C1 (TRP 201 #1) at the first transmission timing. In addition, the UE 100 (the transmitter 111) transmits the second uplink signal to the cell C2 (TRP 201 #2) at the second transmission timing.

The UE 100 (the controller 120) maintains the first alignment timer and the second alignment timer. The first alignment timer (timeAlignmentTimer) is a timer that controls the time during which the transmission timing of the uplink signal to the cell C1 (TRP 201 #1) is regarded as being adjusted. The second alignment timer (timeAlignmentTimer) is a timer that controls the time during which the transmission timing of the uplink signal to the cell C2 (TRP 201 #2) is regarded as being adjusted.

As illustrated in FIG. 16, in step S311, the UE 100 (the controller 120) determines whether the first alignment timer expires. When the first alignment timer expires, the UE 100 (the controller 120) executes the processing in step S312. When the first alignment timer does not expire, the UE 100 (the controller 120) executes the processing in step S314.

In step S312, the UE 100 (the controller 120) releases the first resource. The UE 100 (the controller 120) may perform the following operation as an operation of releasing the first resource.

The UE 100 (the controller 120) may flush all the hybrid ARQ (HARQ) buffers for the cell C1 (TRP 201 #1) in the MAC layer.

When the PUCCH configuration information for the cell C1 (TRP 201 #1) is configured, the UE 100 (the controller 120) may notify the RRC layer that the PUCCH configuration information for the cell C1 (TRP 201 #1) is released in the MAC layer. The UE 100 (the controller 120) may release the PUCCH configuration information in response to the notification in the RRC layer.

When the SRS configuration information for the cell C1 (TRP 201 #1) is configured, the UE 100 (the controller 120) may notify the RRC layer that the SRS configuration information for the cell C1 (TRP 201 #1) is released in the MAC layer. The UE 100 (the controller 120) may release the SRS configuration information in response to the notification in the RRC layer.

The UE 100 (the controller 120) may clear the downlink allocation for the cell C1 (TRP 201 #1) in the MAC layer. The UE 100 (the controller 120) may clear the uplink grant for the cell C1 (TRP 201 #1) in the MAC layer. The UE 100 (the controller 120) may clear the PUSCH resource for reporting the semi-persistent CSI for the cell C1 (TRP 201 #1) in the MAC layer.

The UE 100 (the controller 120) may maintain the first TA value ($N_{TA1}$) calculated based on the first TA ($T_{A1}$).

In step S313, the UE 100 (the controller 120) releases the second resource. The UE 100 (the controller 120) may perform the following operation as an operation of releasing the second resource.

The UE 100 (the controller 120) may flush all the hybrid ARQ (HARQ) buffers for the cell C2 (TRP 201 #2) in the MAC layer.

When the PUCCH configuration information for the cell C2 (TRP 201 #2) is configured, the UE 100 (the controller 120) may notify the RRC layer that the PUCCH configuration information for the cell C2 (TRP 201 #2) is released in the MAC layer. The UE 100 (the controller 120) may release the PUCCH configuration information in response to the notification in the RRC layer.

When the SRS configuration information for the cell C2 (TRP 201 #2) is configured, the UE 100 (the controller 120) may notify the RRC layer that the SRS configuration information for the cell C2 (TRP 201 #2) is released in the MAC layer. The UE 100 (the controller 120) may release the SRS configuration information in response to the notification in the RRC layer.

The UE 100 (the controller 120) may clear the downlink allocation for the cell C2 (TRP 201 #2) in the MAC layer. The UE 100 (the controller 120) may clear the uplink grant for the cell C2 (TRP 201 #2) in the MAC layer. The UE 100 (the controller 120) may clear the PUSCH resource for reporting the semi-persistent CSI for the cell C2 (TRP 201 #2) in the MAC layer.

The UE 100 (the controller 120) may maintain the second TA value ($N_{TA2}$) calculated based on the second TA ($T_{A2}$). Alternatively, the UE 100 (the controller 120) may discard the second TA value.

In step S314, the UE 100 (the controller 120) determines whether the second alignment timer expires. When the second alignment timer expires, the UE 100 (the controller 120) executes the processing in step S312. When the second alignment timer does not expire, the UE 100 (the controller 120) may end the processing.

According to the above description, when the first alignment timer expires, the UE 100 (the controller 120) releases the first resource and also releases the second resource. As a result, when the first resource is released, the second resource is also released, so that communication with the cell C2 (TRP 201 #2) in which a failure may occur is not performed. Therefore, when communication with the cell C2 (TRP 201 #2) can be appropriately controlled, the transmission of the uplink signal to the cell C2 (TRP 201 #2) can be appropriately controlled by performing communication with the cell C2 (TRP 201 #2).

In addition, the UE 100 (the controller 120) may maintain the first TA value and the second TA value even when the first alignment timer expires. In addition, the UE 100 (the controller 120) may maintain the second TA value even when the second alignment timer expires. As a result, when communicating with the cell C2 (TRP 201 #2), the UE 100 (the controller 120) does not need to newly acquire the first TA value and/or the second TA value, and thus signaling between the UE 100 and the base station 200 can be reduced.

In addition, when the second alignment timer expires, the UE 100 (the controller 120) may release the second resource and maintain the first resource. Accordingly, the UE 100 (the controller 120) can continuously perform the data communication with the cell C1 (TRP 201 #1) using the first resource even when the communication with the cell C2 (TRP 201 #2) is not performed due to the release of the second resource.

OTHER EMBODIMENTS

The operation sequence (and the operation flow) in the above-described embodiment may not necessarily be performed in chronological order according to the order described in the flow diagram or the sequence diagram. For example, the steps in the operation may be performed in an order different from the order described as the flow diagram or the sequence diagram, or may be performed in parallel. In addition, some of the steps in the operation may be removed and additional steps may be added to the processing. Furthermore, the operation sequence (and the operation flow) in the above-described embodiment may be performed separately and independently, or may be performed by combining two or more operation sequences (and operation flows). For example, some steps of one operation flow may be added to another operation flow, or some steps of one operation flow may be replaced with some steps of another operation flow.

In the above-described embodiments, a mobile communication system based on the NR is described as an example of the mobile communication system 1. However, the mobile communication system 1 is not limited to this example. The mobile communication system 1 may be a system conforming to a TS of LTE (Long Term Evolution) or another generation system (for example, a sixth generation) of the 3GPP standard. The base station 200 may be an eNB that provides E-UTRA (Evolved Universal Terrestrial Radio Access) user plane and control plane protocol terminations towards the UE 100 in LTE. The mobile communication system 1 may be a system conforming to a TS defined in a standard other than the 3GPP standard. The base station 200 may be an IAB (Integrated Access and Backhaul) donor or an IAB node.

A program for causing a computer to execute each processing performed by the UE 100 or the base station 200 may be provided. The program may be recorded on a computer readable medium. The program can be installed in the computer by using the computer readable medium. Here, the computer readable medium on which the program is recorded may be a non-transitory recording medium. The non-transitory recording medium is not particularly limited, but may be, for example, a recording medium such as a CD-ROM or a DVD-ROM. In addition, a circuit that executes each processing performed by the UE 100 or the base station 200 may be integrated, and at least a part of the UE 100 or the base station 200 may be configured as a semiconductor integrated circuit (a chipset and an SoC).

In the above-described embodiment, "transmit (transmit)" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive (receive)" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire. Similarly, "acquire (obtain/acquire)" may mean to acquire information from stored information, may mean to acquire information from information received from another node, or may mean to acquire the information by generating information. Similarly, "include (include)" and "comprise (comprise)" do not mean to include only the listed items, but mean that the terms may include only the listed items or may include additional items in addition to the listed items. Similarly, in the present disclosure, "or (or)" does not mean exclusive OR but means OR.

Although the embodiment has been described in detail with reference to the drawings, the specific configuration is not limited to the above description, and various design changes and the like can be made without departing from the gist.

Although the present disclosure has been described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements are also within the scope and idea of the present disclosure.

Supplementary Notes

Features according to the above-described embodiment will be additionally described.

Supplementary Note 1

A user equipment (100) having a first cell (C1) and a second cell (C2) configured therein by a base station (200), the first cell (C1) serving as a serving cell and the second cell (C2) belonging to a same frequency as a frequency of the first cell (C1), each of the first cell (C1) and the second cell (C2) being managed by the base station (200), the user equipment (100) comprising:

a transmitter configured to transmit an uplink signal to the first cell (C1) by using a first resource related to transmission of the uplink signal to the first cell (C1), and to transmit an uplink signal to the second cell (C2) by using a second resource related to transmission of the uplink signal to the second cell (C2); and a controller (120) configured to maintain a first alignment timer that controls a time during which the transmission timing of the uplink signal to the first cell (C1) is regarded as being adjusted, in which the controller (120) is configured to release, when the first alignment timer expires, the first resource and the second resource.

Supplementary Note 2

The user equipment (100) according to supplementary note 1, in which the controller (120) is configured to maintain, even when the first alignment timer expires, a first timing advance value and a second timing advance value, the first timing advance value being calculated based on a first timing advance used for adjusting the transmission timing of the uplink signal to the first cell (C1), the second timing advance value being calculated based on a second timing advance used for adjusting the transmission timing of the uplink signal to the second cell (C2).

Supplementary Note 3

The user equipment (100) according to supplementary note 1 or 2, in which the controller (120) is configured to further maintain a second alignment timer that controls a time during which the transmission timing of the uplink signal to the second cell (C2) is regarded as being adjusted, and the controller (120) is configured to, when the second alignment timer expires, release the second resource and maintain the first resource.

Supplementary Note 4

The user equipment (100) according to supplementary note 3, in which the controller (120) is configured to maintain, even when the second alignment timer expires, the second timing advance value calculated based on the second timing advance used for adjusting the transmission timing of the uplink signal to the second cell (C2).

Supplementary Note 5

A communication method executed by a user equipment (100) having a first cell (C1) and a second cell (C2) configured therein by a base station (200), the first cell (C1) serving as a serving cell and the second cell (C2) belonging to a same frequency as a frequency of the first cell (C1), each of the first cell (C1) and the second cell (C2) being managed by the base station (200), the communication method comprising the steps of:

transmitting an uplink signal to the first cell (C1) by using a first resource related to transmission of the uplink signal to the first cell (C1), and transmitting an uplink signal to the second cell (C2) by using a second resource related to transmission of the uplink signal to the second cell (C2);

maintaining a first alignment timer that controls a time during which the transmission timing of the uplink signal to the first cell (C1) is regarded as being adjusted; and releasing, when the first alignment timer expires, the first resource and the second resource.

The invention claimed is:

1. A communication apparatus comprising:

a receiver configured to:

receive, using a radio resource control (RRC) signaling, from a base station, configuration information including information for configuring each of an identifier of a first timing advance group and an identifier of a second timing advance group, and information for configuring an offset value corresponding to the second timing advance group, the configuration information being used for configuring the communication apparatus with one serving cell;

receive, on the one serving cell, from the base station, information for activating a transmission configuration indication (TCI) state corresponding to the second timing advance group; and a controller configured to control a time alignment timer corresponding to the second timing advance group;

wherein:

the controller is configured to control not to perform an uplink transmission on the second timing advance group corresponding to the TCI state activated by the information for activating the TCI state, in a case where the time alignment timer expires;

the receiver is configured to receive, from the base station, a random access response including one of a first timing advance command corresponding to the first timing advance group and a second timing advance command corresponding to the second timing advance group; and the controller is further configured to:

in a case where the random access response including the second timing advance command is received, control an alignment value of timing for an uplink transmission based on the information for configuring the offset value corresponding to the second timing advance group and the second timing advance command, and start the time alignment timer; and maintain the alignment value of the timing in a case where the time alignment timer expires.

2. The communication apparatus according to claim 1, wherein:

the uplink transmission that is controlled not to be performed in the case where the time alignment timer expires includes at least one of a transmission on a physical uplink control channel and a transmission of a sounding reference signal.

3. The communication apparatus according to claim 1, wherein:

the uplink transmission, for which the alignment value of the timing is controlled in the case where the random access response including the second timing advance command is received, is performed in a random access procedure.

4. The communication apparatus according to claim 1, wherein:

the receiver is configured to receive, from the base station, a media access control (MAC) control element including the second timing advance command corresponding to the identifier of the second timing advance group.

5. A base station comprising:

a transmitter configured to:

transmit, using a radio resource control (RRC) signaling, to a communication apparatus, configuration information including information for configuring each of an identifier of a first timing advance group and an identifier of a second timing advance group, and information for configuring an offset value corresponding to the second timing advance group, the configuration information being used for configuring the communication apparatus with one serving cell, and transmit on the one serving cell, to the communication apparatus, information for activating a transmission configuration indication (TCI) state corresponding to the second timing advance group;

wherein:

the transmitter transmits a timing advance command for starting a time alignment timer corresponding to the second timing advance group;

an uplink transmission on the second timing advance group corresponding to the TCI state activated by the information for activating the TCI state is not performed, in a case where the time alignment timer expires;

the transmitter is further configured to transmit, to the communication apparatus, a random access response including one of a first timing advance command corresponding to the first timing advance group and a second timing advance command corresponding to the second timing advance group;

the information for configuring the offset value corresponding to the second timing advance group and the second timing advance command are used in the communication apparatus to control an alignment value of timing for an uplink transmission and to start the time alignment timer; and the alignment value of the timing is maintained in the communication apparatus in a case where the time alignment timer expires.

6. The base station according to claim 5, wherein:

the uplink transmission that is not to be performed in the case where the time alignment timer expires includes at least one of a transmission on a physical uplink control channel and a transmission of a sounding reference signal.

7. The base station according to claim 5, wherein;

the uplink transmission, for which the alignment value of the timing is controlled in the case where the random access response including the second timing advance command is received by the communication apparatus, is performed in a random access procedure.

8. The base station according to claim 5, wherein;

the transmitter is configured to transmit, to the communication apparatus, a media access control (MAC) control element including the second timing advance command corresponding to the identifier of the second timing advance group.

9. A communication method executed by a communication apparatus comprising:

receiving, using a radio resource control (RRC) signaling, from a base station, configuration information including information for configuring each of an identifier of a first timing advance group and an identifier of a second timing advance group, and information for configuring an offset value corresponding to the second timing advance group, the configuration information being used for configuring the communication apparatus with one serving cell;

receiving on the one serving cell, from the base station, information for activating a transmission configuration indication (TCI) state corresponding to the second timing advance group;

controlling a time alignment timer corresponding to the second timing advance group;

controlling not to perform an uplink transmission on the second timing advance group corresponding to the TCI state activated by the information for activating the TCI state, in a case where the time alignment timer expires;

receiving, from the base station, a random access response including one of a first timing advance command corresponding to the first timing advance group and a second timing advance command corresponding to the second timing advance group;

in a case where the random access response including the second timing advance command is received, controlling an alignment value of timing for an uplink transmission based on the information for configuring the offset value corresponding to the second timing advance group and the second timing advance command and starting the time alignment timer; and maintaining the alignment value of the timing in a case where the time alignment timer expires.

10. The communication method according to claim 9, wherein:

the uplink transmission that is controlled not to be performed in the case where the time alignment timer expires includes at least one of a transmission on a physical uplink control channel and a transmission of a sounding reference signal.

11. The communication method according to claim 9, wherein:

the uplink transmission, for which the alignment value of the timing is controlled in the case where the random access response including the second timing advance command is received, is performed in a random access procedure.

12. The communication method according to claim 9, further comprising:

receiving, from the base station, a media access control (MAC) control element including the second timing advance command corresponding to the second timing advance group.

* * * * *